United States Patent
Tsovilis et al.

(10) Patent No.: US 11,223,200 B2
(45) Date of Patent: Jan. 11, 2022

(54) SURGE PROTECTIVE DEVICES, CIRCUITS, MODULES AND SYSTEMS INCLUDING SAME

(71) Applicant: RIPD IP DEVELOPMENT LTD, Nicosia (CY)

(72) Inventors: Thomas Tsovilis, Salonika (GR); Robert Rozman, Smlednik (SI); Ernest Belič, Rogaška Slatina (SI); Sebastjan Kamenšek, Škofja Loka (SI)

(73) Assignee: RIPD IP DEVELOPMENT LTD, Nicosia (CY)

( * ) Notice: Subject to any disclaimer, the term of this patent is extended or adjusted under 35 U.S.C. 154(b) by 305 days.

(21) Appl. No.: 16/046,281

(22) Filed: Jul. 26, 2018

(65) Prior Publication Data

US 2020/0036185 A1    Jan. 30, 2020

(51) Int. Cl.
 *H02H 9/06* (2006.01)
 *H02H 5/04* (2006.01)
 *H01C 7/10* (2006.01)

(52) U.S. Cl.
 CPC .............. *H02H 9/06* (2013.01); *H02H 5/04* (2013.01); *H01C 7/10* (2013.01)

(58) Field of Classification Search
 CPC ............ H02H 9/00; H02H 9/005; H02H 9/04; H02H 9/06; H02H 3/22; H02H 3/00; H02H 3/20; H02H 3/202; H02H 9/008; H02H 9/041; H02H 9/042; H02H 9/043; H02H 1/0015; H02H 3/205; H02H 5/04; H02H 5/047; H01C 7/10; H01C 7/12; H01C 7/102
 See application file for complete search history.

(56) References Cited

U.S. PATENT DOCUMENTS

| | | |
|---|---|---|
| 1,144,029 A | 6/1915 | Creighton |
| 2,158,859 A | 5/1939 | Horikoshi |
| 2,311,758 A | 2/1943 | Johansson |
| 2,805,294 A | 9/1957 | Edmunds |
| 2,971,132 A | 2/1961 | Nash |
| 3,249,719 A | 5/1966 | Misare et al. |

(Continued)

FOREIGN PATENT DOCUMENTS

| | | |
|---|---|---|
| CH | 466427 | 12/1968 |
| CN | 106026067 A | 10/2016 |

(Continued)

OTHER PUBLICATIONS

Extended European Search Report in corresponding European Application No. 19171748.7 (dated Dec. 4, 2019).

(Continued)

*Primary Examiner* — Gustavo A Rosario-Benitez
(74) *Attorney, Agent, or Firm* — Myers Bigel, P.A.

(57) ABSTRACT

A surge protective device (SPD) includes a first electrical terminal, a second electrical terminal, and an overvoltage protection circuit connected between the first and second electrical terminals. The overvoltage protection circuit includes a gas discharge tube and a current management circuit connected in series to the gas discharge tube. The current management circuit includes a varistor and a resistor that are connected in parallel between a first node of the current management circuit and a second node of the current management circuit.

30 Claims, 22 Drawing Sheets

(56) References Cited

U.S. PATENT DOCUMENTS

| | | | |
|---|---|---|---|
| 3,375,405 A | 3/1968 | Fallon et al. | |
| 3,522,570 A | 8/1970 | Wanaselja | |
| 3,711,794 A | 1/1973 | Tasca et al. | |
| 3,743,996 A | 7/1973 | Harnden | |
| 3,813,577 A | 5/1974 | Kawiecke | |
| 4,015,228 A | 3/1977 | Eda et al. | |
| 4,023,133 A | 5/1977 | Knapp, Jr. | |
| 4,085,397 A | 4/1978 | Yagher, Jr. | |
| 4,092,694 A | 5/1978 | Stetson | |
| 4,217,618 A | 8/1980 | Boney et al. | |
| 4,240,124 A | 12/1980 | Westrom | |
| 4,241,374 A | 12/1980 | Gilberts | |
| 4,249,224 A | 2/1981 | Baumbach | |
| 4,288,833 A | 9/1981 | Howell | |
| 4,355,345 A | 10/1982 | Franchet | |
| 4,425,017 A | 1/1984 | Chan | |
| 4,493,003 A | 1/1985 | Mickelson et al. | |
| 4,571,656 A | 2/1986 | Ruckman | |
| 4,595,635 A | 6/1986 | Dubrow et al. | |
| 4,600,261 A | 7/1986 | Debbaut | |
| 4,638,284 A | 1/1987 | Levinson | |
| 4,677,518 A * | 6/1987 | Hershfield | H02H 9/06 361/118 |
| 4,701,574 A | 10/1987 | Shimirak et al. | |
| 4,906,963 A | 3/1990 | Ackermann et al. | |
| 4,908,730 A | 3/1990 | Westrom | |
| 4,956,696 A | 9/1990 | Hoppe et al. | |
| 5,006,950 A | 4/1991 | Allina | |
| 5,130,884 A | 7/1992 | Allina | |
| 5,172,296 A | 12/1992 | Kaczmarek | |
| 5,311,164 A | 5/1994 | Ikeda et al. | |
| 5,519,564 A | 5/1996 | Carpenter, Jr. | |
| 5,523,916 A | 6/1996 | Kaczmarek | |
| 5,529,508 A | 6/1996 | Chiotis et al. | |
| 5,588,856 A | 12/1996 | Collins et al. | |
| 5,621,599 A | 4/1997 | Larsen et al. | |
| 5,652,690 A | 7/1997 | Mansfield et al. | |
| 5,721,664 A | 2/1998 | Uken et al. | |
| 5,724,221 A | 3/1998 | Law | |
| 5,745,322 A * | 4/1998 | Duffy | H02H 3/334 361/45 |
| 5,781,394 A | 7/1998 | Lorenz et al. | |
| 5,808,850 A | 9/1998 | Carpenter, Jr. | |
| 5,812,047 A * | 9/1998 | van Kampen | G01L 9/0054 257/419 |
| 5,936,824 A | 8/1999 | Carpenter, Jr. | |
| 5,990,778 A | 11/1999 | Strumpler et al. | |
| 6,038,119 A | 3/2000 | Atkins et al. | |
| 6,094,128 A | 7/2000 | Bennett et al. | |
| 6,172,865 B1 | 1/2001 | Boy et al. | |
| 6,175,480 B1 | 1/2001 | Karmazyn | |
| 6,222,433 B1 | 4/2001 | Ramakrishnan et al. | |
| 6,226,166 B1 | 5/2001 | Gumley et al. | |
| 6,430,019 B1 | 8/2002 | Martenson et al. | |
| 6,430,020 B1 | 8/2002 | Atkins et al. | |
| 6,459,559 B1 | 10/2002 | Christofersen | |
| 6,556,402 B2 | 4/2003 | Kizis et al. | |
| 6,614,640 B2 | 9/2003 | Richter et al. | |
| 6,930,871 B2 | 8/2005 | Macanda | |
| 7,433,169 B2 | 10/2008 | Kamel et al. | |
| 7,558,041 B2 | 7/2009 | Lagnoux | |
| 7,684,166 B2 | 3/2010 | Donati et al. | |
| 7,738,231 B2 | 6/2010 | Lagnoux | |
| 8,493,170 B2 | 7/2013 | Zaeuner et al. | |
| 8,659,866 B2 | 2/2014 | Douglass et al. | |
| 8,699,197 B2 | 4/2014 | Douglass et al. | |
| 8,743,525 B2 | 6/2014 | Xepapas et al. | |
| 9,349,548 B2 | 5/2016 | Juricev | |
| 9,355,763 B2 | 5/2016 | Xu | |
| 9,570,260 B2 | 2/2017 | Yang et al. | |
| 9,634,554 B2 | 4/2017 | Falk et al. | |
| 9,906,017 B2 | 2/2018 | Tsovilis et al. | |
| 2002/0018331 A1 | 2/2002 | Takahashi | |
| 2002/0024792 A1 | 2/2002 | Cantagrel | |
| 2003/0184926 A1 | 10/2003 | Wu et al. | |
| 2004/0150937 A1 | 8/2004 | Bobert et al. | |
| 2005/0185356 A1 | 8/2005 | Durth | |
| 2005/0231872 A1 | 10/2005 | Schimanski et al. | |
| 2006/0034031 A1 * | 2/2006 | Lehuede | H02H 9/041 361/118 |
| 2006/0245125 A1 | 11/2006 | Aszmus | |
| 2006/0291127 A1 | 12/2006 | Kim et al. | |
| 2007/0217106 A1 | 9/2007 | Lagnoux | |
| 2008/0043395 A1 | 2/2008 | Donati et al. | |
| 2008/0049370 A1 | 2/2008 | Adachi et al. | |
| 2009/0302992 A1 | 12/2009 | Cernicka | |
| 2011/0013330 A1 | 1/2011 | Crevenat et al. | |
| 2011/0193674 A1 | 8/2011 | Zauner et al. | |
| 2011/0248816 A1 | 10/2011 | Duval et al. | |
| 2012/0050935 A1 | 3/2012 | Douglass et al. | |
| 2012/0086539 A1 | 4/2012 | Duval et al. | |
| 2012/0086540 A1 | 4/2012 | Duval et al. | |
| 2012/0206848 A1 | 8/2012 | Gillespie et al. | |
| 2012/0250205 A1 | 10/2012 | Pfitzer et al. | |
| 2013/0038976 A1 | 2/2013 | Hagerty | |
| 2013/0200986 A1 | 8/2013 | Koprivsek | |
| 2013/0208387 A1 * | 8/2013 | Nguyen | H02H 3/02 361/118 |
| 2013/0265685 A1 | 10/2013 | Zäuner et al. | |
| 2013/0335869 A1 | 12/2013 | Xepapas et al. | |
| 2014/0010704 A1 | 1/2014 | Ishida et al. | |
| 2014/0092514 A1 | 4/2014 | Chen | |
| 2014/0292472 A1 | 10/2014 | Qin et al. | |
| 2014/0327990 A1 | 11/2014 | Juricev | |
| 2015/0014538 A1 * | 1/2015 | Holliday | G01J 5/0096 250/340 |
| 2015/0103462 A1 | 4/2015 | Depping | |
| 2015/0107972 A1 | 4/2015 | Oh | |
| 2015/0108899 A1 * | 4/2015 | Ramabhadran | H02H 9/04 315/112 |
| 2015/0270086 A1 | 9/2015 | Chen | |
| 2015/0280420 A1 | 10/2015 | Mao | |
| 2015/0349523 A1 | 12/2015 | Tsovilis et al. | |
| 2016/0087520 A1 | 3/2016 | Falk et al. | |
| 2016/0276821 A1 | 9/2016 | Politis et al. | |
| 2016/0329701 A1 * | 11/2016 | Bandel | H02H 3/22 |
| 2017/0311462 A1 | 10/2017 | Kamensek et al. | |
| 2018/0138697 A1 * | 5/2018 | Crevenat | H02H 7/24 |
| 2018/0138698 A1 | 5/2018 | Tsovilis et al. | |
| 2018/0151318 A1 | 5/2018 | Kamensek et al. | |
| 2018/0183230 A1 | 6/2018 | Kostakis et al. | |
| 2018/0183232 A1 | 6/2018 | Tavcar et al. | |
| 2018/0330908 A1 | 11/2018 | Vrhunc et al. | |
| 2018/0341024 A1 * | 11/2018 | Shetty | G01S 19/36 |
| 2019/0080826 A1 | 3/2019 | Kamensek et al. | |
| 2019/0099132 A1 * | 4/2019 | Mulinti | A61B 5/6833 |

FOREIGN PATENT DOCUMENTS

| | | |
|---|---|---|
| DE | 3111096 A1 | 9/1982 |
| DE | 3428258 | 2/1986 |
| DE | 4235329 | 4/1994 |
| DE | 69201021 T2 | 5/1995 |
| DE | 4438593 | 5/1996 |
| DE | 19823446 | 11/1999 |
| DE | 19839422 | 3/2000 |
| DE | 19843519 | 4/2000 |
| DE | 202004006227 | 10/2004 |
| DE | 10323220 | 12/2004 |
| DE | 102006003274 | 1/2008 |
| DE | 202008004699 | 6/2008 |
| DE | 102007014336 | 10/2008 |
| DE | 102008017423 | 10/2009 |
| DE | 102008026555 | 12/2009 |
| DE | 102013021936 | 2/2012 |
| DE | 102012004678 | 9/2013 |
| DE | 202006021210 | 9/2013 |
| DE | 102013103753 | 10/2013 |
| DE | 102013011216 | 10/2014 |
| DE | 102013107807 | 1/2015 |
| DE | 102014016938 | 2/2016 |
| DE | 102014016830 | 9/2016 |
| DE | 102007030653 B4 | 4/2017 |

(56) References Cited

FOREIGN PATENT DOCUMENTS

| | | |
|---|---|---|
| EP | 0108518 | 5/1984 |
| EP | 0203737 | 12/1986 |
| EP | 0335479 | 10/1989 |
| EP | 0445054 | 9/1991 |
| EP | 0462694 | 12/1991 |
| EP | 0516416 | 12/1992 |
| EP | 0603428 | 6/1994 |
| EP | 0785625 | 7/1997 |
| EP | 1094550 | 4/2001 |
| EP | 1102371 | 5/2001 |
| EP | 1116246 | 7/2001 |
| EP | 1148530 A1 | 10/2001 |
| EP | 1355327 | 10/2003 |
| EP | 1458072 | 9/2004 |
| EP | 0963590 | 11/2004 |
| EP | 1798742 | 6/2007 |
| EP | 2075811 | 7/2009 |
| EP | 2707892 | 3/2014 |
| EP | 2725588 | 4/2014 |
| EP | 2953142 A1 | 12/2015 |
| EP | 2954538 B1 | 12/2015 |
| EP | 3001525 | 3/2016 |
| EP | 3240132 | 11/2017 |
| EP | 3460938 A1 | 3/2019 |
| FR | 2574589 | 6/1986 |
| FR | 2622047 | 4/1989 |
| FR | 2897231 | 8/2007 |
| JP | 60-187002 | 9/1985 |
| JP | 60-226103 | 11/1985 |
| JP | 60-258905 | 12/1985 |
| JP | 61-198701 | 9/1986 |
| JP | 1-176687 | 7/1989 |
| JP | H05176445 | 7/1993 |
| JP | 09-326546 | 12/1997 |
| JP | 2002-525861 | 8/2002 |
| JP | 2002-525862 | 8/2002 |
| SI | 9700277 | 4/1999 |
| SI | 9700332 | 6/1999 |
| SI | 20781 | 6/2002 |
| SI | 20782 | 6/2002 |
| SI | 22030 | 10/2006 |
| SI | 23303 | 8/2011 |
| SI | 23749 | 11/2012 |
| SI | 24371 | 11/2014 |
| WO | 88/00603 | 1/1988 |
| WO | 90/05401 | 5/1990 |
| WO | 95/15600 | 6/1995 |
| WO | 95/24756 | 9/1995 |
| WO | 97/42693 | 11/1997 |
| WO | 98/38653 | 9/1998 |
| WO | 00/17892 | 3/2000 |
| WO | 2007/117163 | 10/2007 |
| WO | 2008/009507 | 1/2008 |
| WO | 2008/104824 | 9/2008 |
| WO | 2011/102811 | 8/2011 |
| WO | WO-2011102811 A2 * | 8/2011 ............ H01C 7/126 |
| WO | 2012/026888 | 3/2012 |
| WO | 2012/154134 | 11/2012 |
| WO | 2013/044961 | 4/2013 |
| WO | 2016/101776 | 6/2016 |
| WO | 2016/110360 | 7/2016 |

OTHER PUBLICATIONS

Beitz et al. "Dubbel Taschenbuch für den Maschinenbau" (3 pages) (1997).
Data Book Library 1997 Passive Components, Siemens Matsushita Components pp. 15-17, 26-32, 36-37, 39, 161, 166, 167, 169, 171-174 (1997).
Oberg et al. "Machinery's Handbook 27th Edition—Soldering and Brazing" (4 pages) (2004).
Raycap "Rayvoss™ Transient Voltage Surge Suppression System" webpage, http://www.raycap.com/surge/rayvoss.htm accessed on Nov. 29, 2005 (1 page) (Date Unknown; Admitted Prior Art).
Raycap "Revolutionary Lightning Protection Technology" Raycap Corporation Press Release, webpage, http://www.raycap.com/news/020930.htm accessed on Nov. 29, 2005 (1 page) (Date Unknown; Admitted Prior Art).
Raycap "The Ultimate Overvoltage Protection: Rayvoss™" brochure (4 pages) (Date Unknown; Admitted Prior Art).
Raycap "Strikesorb® 30 Series OEM Surge Suppression Solutions" brochure (2 pages) (Apr. 17, 2009).
Raycap "The Next Generation Surge Protection Rayvoss™" brochure (4 pages) (May 4, 2012).
Raycap "The Ultimate Overvoltage Protection Rayvoss™" brochure (4 pages) (2005).
Raycap "The Ultimate Overvoltage Protection Rayvoss™" brochure (4 pages) (Jan. 2009).
Rayvoss™ "The Ultimate Overvoltage Protection" webpage, http://www.rayvoss.com accessed on Nov. 29, 2005 (2 pages) (Date Unknown; Admitted Prior Art).
Rayvoss™ "Applications" webpage http://www.rayvoss.com/applications.htm accessed on Nov. 29, 2005 (4 pages) (undated).
Rayvoss™ "Frequently Asked Questions" webpage, http://www.rayvoss.com/faq.htm accessed on Nov. 29, 2005 (2 pages) (Date Unknown; Admitted Prior Art).
Rayvoss™ "Technical Information" webpage, http://www.rayvoss.com/tech_info.htm accessed on Nov. 29, 2005 (3 pages) (Date Unknown; Admitted Prior Art).
Translation of DIN-Standards, Built-In Equipment for Electrical Installations; Overall Dimensions and Related Mounting Dimensions (15 pages) (Dec. 1988).
VAL-MS-T1/T2 335/12.5/3+1, Extract from the online catalog, Phoenix Contact GmbH & Co. KG, http://catalog.phoenixcontact.net/phoenix/treeViewClick.do?UID=2800184 (7 pages) (May 22, 2014).
Formex™ GK/Formex Product Data Flame Retardant Polypropylene Sheet, ITW Formex (4 pages) (2002).
DuPont 4300 Series Resistors Technical Data Sheet (3 pages) (May 2013).

* cited by examiner

SURGE PROTECTIVE DEVICES, CIRCUITS, MODULES AND SYSTEMS INCLUDING SAME

FIELD OF THE INVENTION

The present invention relates to surge protective devices and, more particularly, to surge protective devices including varistors.

BACKGROUND OF THE INVENTION

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges is not acceptable and resulting down time may be very costly.

Typically, sensitive electronic equipment may be protected against transient overvoltages and surge currents using surge protective devices (SPDs). For example, an overvoltage protection device may be installed at a power input of equipment to be protected, which is typically protected against overcurrents when it fails. Typical failure mode of an SPD is a short circuit. The overcurrent protection typically employed is a combination of an internal thermal disconnector to protect the device from overheating due to increased leakage currents and an external fuse to protect the device from higher fault currents. Different SPD technologies may avoid the use of the internal thermal disconnector because, in the event of failure, they change their operation mode to a low ohmic resistance.

In the event of a surge current in a line L (e.g., a voltage line of a three phase electrical power circuit), protection of power system load devices may necessitate providing a current path to ground for the excess current of the surge current. The surge current may generate a transient overvoltage between the line L and the neutral line N (the neutral line N may be conductively coupled to an earth ground PE). Since the transient overvoltage significantly exceeds the operating voltage of the SPD, the SPD will become conductive, allowing the excess current to flow from line L through the SPD to the neutral line N. Once the surge current has been conducted to the neutral line N, the overvoltage condition ends and the SPD may become non-conducting again. However, in some cases, one or more SPDs may begin to allow a leakage current to be conducted even at voltages that are lower that the operating voltage of the SPDs. Such conditions may occur in the case of an SPD deteriorating.

SUMMARY

According to some embodiments of the inventive concept, a surge protective device (SPD) comprises a first electrical terminal, a second electrical terminal and an overvoltage protection circuit connected between the first and second electrical terminals. The overvoltage protection circuit comprises a gas discharge tube and a current management circuit connected in series to the gas discharge tube. The current management circuit comprises a varistor and a resistor that are connected in parallel between a first node of the current management circuit and a second node of the current management circuit.

In some embodiments, the current management circuit further comprises an inductor connected in series with the resistor between the first and second nodes of the current management circuit.

In some embodiments, the inductor comprises a Surface Mount Device (SMD) inductor.

In some embodiments, the inductor has an inductance in a range of from about 1 µH to about 1 mH.

In some embodiments, the overvoltage protection circuit further comprises a thermal disconnector mechanism that is connected in series to the gas discharge tube and the current management circuit. The thermal disconnector mechanism is configured to electrically disconnect the first electrical terminal from the second electrical terminal responsive to a thermal event.

In some embodiments, the resistor comprises an axial resistor and has a resistance in a range of from about 1 kΩ to 50 MΩ.

In some embodiments, the resistor comprises a radial resistor and has a resistance in a range of from about 1 kΩ to 50 MΩ.

In some embodiments, the resistor comprises a Surface Mount Device (SMD) resistor and has a resistance in a range of from about 1 kΩ to 50 MΩ.

In some embodiments, the varistor has a peak current rating of about 20 kA and a peak voltage rating of about 300 V.

In some embodiments, the gas discharge tube has a DC sparkover voltage rating of about 500 V at a voltage rise of 100 V/s and a discharge current rating of about 20 kA.

In some embodiments, the varistor has a clamping voltage level associated therewith that exceeds an ambient voltage level associated with the first electrical terminal.

In some embodiments, the current management circuit is configured to facilitate a transition of the gas discharge tube from a non-conducting state to a conducting state by causing a voltage across the gas discharge tube to exceed a sparkover voltage associated with the gas discharge tube responsive to a transient overvoltage event associated with the first electrical terminal.

In some embodiments, the current management circuit is configured to facilitate a transition of the gas discharge tube from the conducting state to the non-conducting state by dissipating energy associated by causing the voltage across the gas discharge tube to be less than an arc voltage associated with the gas discharge tube responsive to termination of the transient overvoltage event.

In some embodiments, the first electrical terminal is configured for connection to a line and the second electrical terminal is configured for connection to a common reference voltage.

In some embodiments, the line is an Alternating Current (AC) or Direct Current (DC) power line.

In some embodiments, the line is a communication line configured to transmit a communication signal.

In some embodiments, the communication signal is an RF communication signal.

In some embodiments, the SPD includes a second gas discharge tube connected in parallel with the first gas discharge tube between the current management circuit and the first electrical terminal.

In some embodiments, the SPD includes a base and an SPD module. The base is configured to be mounted on a DIN rail. The SPD module is configured to be removably mounted on the base. When the SPD module is mounted on the base the SPD module and the base together form a DIN rail SPD assembly. The SPD module includes: a module housing; the first and second electrical terminals mounted on the module housing; the gas discharge tube disposed in the module housing; and the current management circuit disposed in the module housing.

In some embodiments, the SPD module includes a thermal disconnector mechanism positioned in a ready configuration, wherein the varistor is electrically connected with the second electrical terminal. The thermal disconnector mechanism is repositionable to electrically disconnect the varistor from the second electrical terminal. The thermal disconnector mechanism includes an electrode electrically connected to the varistor in the ready configuration, and a solder securing the electrical conductor in electrical connection with the varistor in the ready configuration. The solder is meltable in response to overheating in the SPD module. The thermal disconnector mechanism is configured to electrically disconnect the electrical conductor from the varistor and thereby disconnect the varistor from the second electrical terminal when the solder is melted.

According to some embodiments, the SPD module includes an indicator mechanism configured to provide an alert that the SPD module has failed when the thermal disconnector mechanism disconnects the overvoltage clamping element from the second electrical terminal.

In some embodiments, the indicator mechanism includes a local alert mechanism including: a window in the module housing; an indicator member movable between a ready position and an indicating position relative to the window; and an indicator spring configured to force the indicator member from the ready position to the indicating position when the thermal disconnector mechanism disconnects the varistor from the second module electrical terminal.

According to some embodiments, the SPD is an SPD module including: a module housing including first and second electrodes, wherein the first electrode includes the first electrical terminal and the second electrode includes the second electrical terminal; and the gas discharge tube and the varistor are axially stacked between the first and second electrodes in the module housing.

In some embodiments, the first electrode includes a housing electrode including an end wall and an integral sidewall collectively defining a cavity, the second electrode extends into the cavity, and the gas discharge tube and the varistor are disposed in the cavity.

According to some embodiments, the housing electrode is unitarily formed of metal.

In some embodiments, the SPD includes a biasing device applying an axially compressive load to the gas discharge tube and the varistor.

In some embodiments, the SPD includes an electrically conductive meltable member. The meltable member is responsive to heat in the overvoltage protection device to melt and form an electrical short circuit path across the first and second electrode members.

In some embodiments, the varistor comprises a varistor wafer.

In some embodiments, the SPD includes: a first internal electrode axially interposed between the varistor wafer and the first electrode; and a second internal electrode axially interposed between the varistor wafer and the second electrode; wherein the resistor is electrically connected to the first and second electrodes in the module housing.

According to some embodiments, the resistor is positioned laterally alongside an outer edge of the varistor wafer.

In some embodiments, the resistor is positioned axially underneath the varistor wafer.

In some embodiments, the resistor is configured to discharge a capacitance of the varistor responsive to a voltage surge event across the first and second electrical terminals.

In some embodiments, the resistor is a layer of an electrically resistive material mounted on the varistor.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 2:
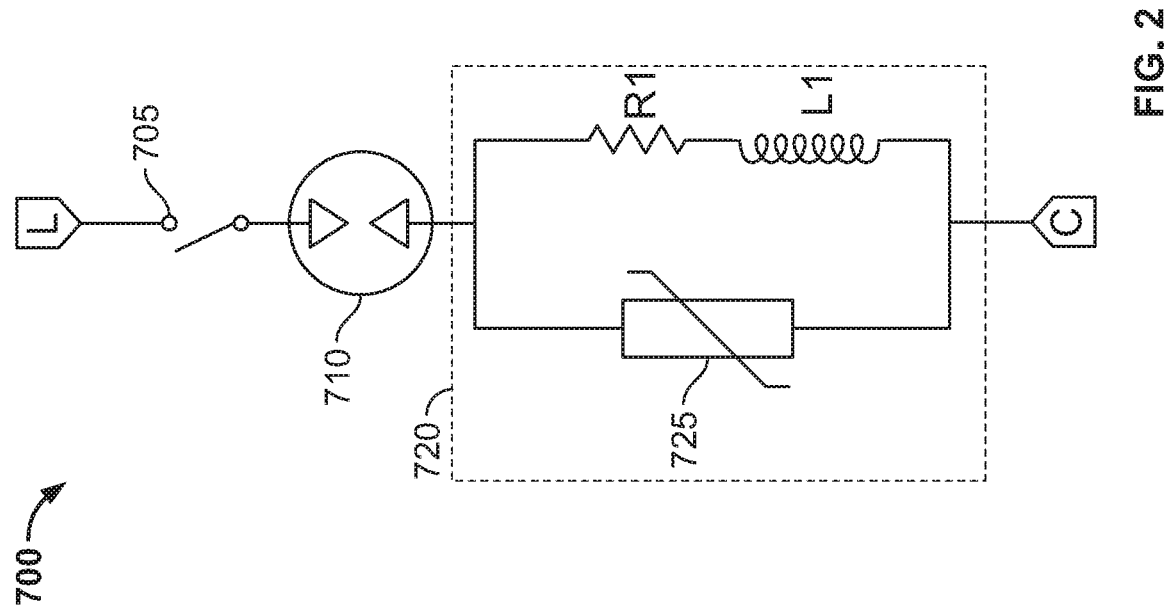
FIGS. 1 and 2 are electrical schematics of overvoltage protection circuits for use in an SPD in accordance with some embodiments of the inventive concept.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams. Alternatively, a unitary object can be a composition composed of multiple parts or components secured together at joints or seams.

Gas discharge tubes (GDTs) and metal oxide varistors (MOV) may be used in surge protection devices (SPDs), but both GDTs and MOVs have advantages and drawbacks in shunting current away from sensitive electronic components in response to overvoltage surge events. For example, MOVs have the advantage of responding rapidly to surge events and being able to dissipate the power associated with surge events. But MOVs have the disadvantages of having increased capacitance relative to GDTs and passing a leakage current therethrough even in ambient conditions. MOVs may also have a decreased lifetime expectancy relative to GDTs. GDTs have the advantage of having extremely low to no leakage current, minimal capacitance, and an increased lifetime expectancy relative to MOVs. But GDTs are not as responsive to surge events as MOVs. Moreover, when a GDT fires and transitions into the arc region in response to a surge event, the GDT may remain in a conductive state if the ambient voltage on the line to which the GDT is connected exceeds the arc voltage. Some embodiments of the inventive concept stem from a realization that SPDs may include an overvoltage protection circuit that includes both a GDT and a current management circuit that includes a MOV. The GDT may mitigate current leakage issues associated with the MOV, which may extend the working life of the MOV. The current management circuit including the MOV may facilitate triggering of the GDT in response to a transient overvoltage event while the MOV provides improved energy dissipation and voltage clamping for one terminal of the GDT to extinguish the GDT follow current and allow the GDT to reset to a non-conducting state following the transient overvoltage event.

Figure 1:
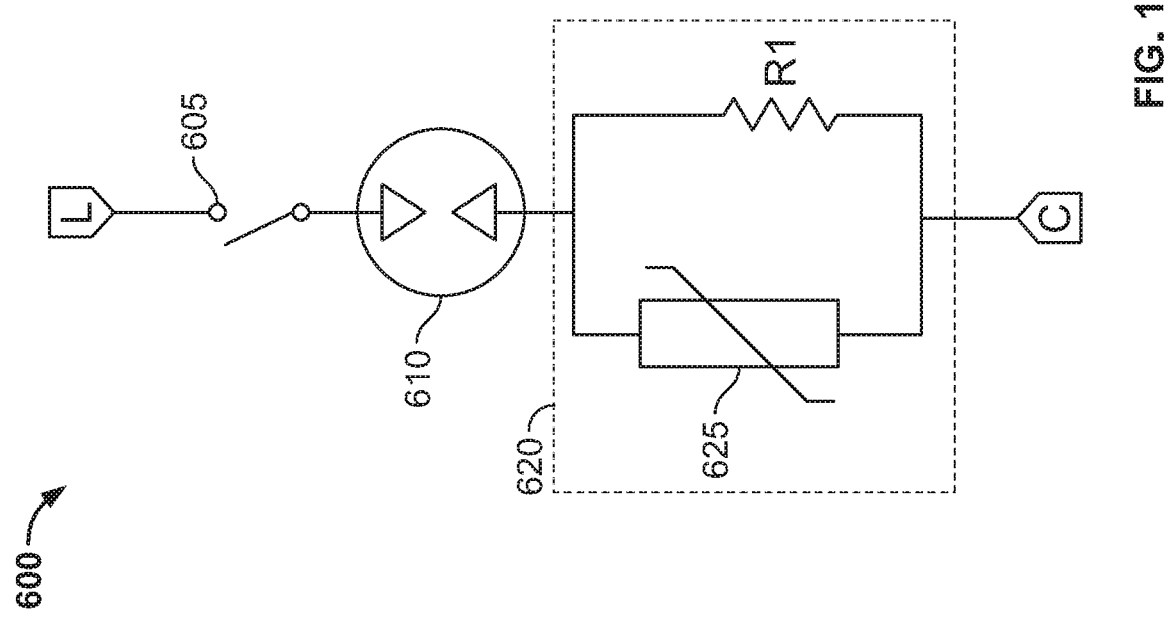

Referring to FIG. 1, an overvoltage protection circuit 600 according to some embodiments of the inventive concept is shown therein. The overvoltage protection circuit 600 may be used in embodiments of SPD assemblies and modules described herein, such as SPDs 100, 200, 300, 400, and 500 of FIGS. 6-21, according to some embodiments of the inventive concept.

The overvoltage protection circuit 600 includes a thermal disconnector mechanism 605, a GDT 610, and a current management circuit 620 that are coupled in series between a first electrical terminal L and a second electrical terminal C. The first electrical terminal L may be configured for electrical connection to a line, such as the lines L1, L2, L3, and N of FIG. 5 or other type of physical electrical transmission medium. In accordance with various embodiments of the inventive concept, the electrical terminal may be electrically connected to a line that is configured to carry an Alternating Current (AC) signal, a Direct Current (DC) signal, and/or a communication signal. In some embodiments, the communication signal may be a Radio Frequency (RF) communication signal. The second electrical terminal C may be configured for electrical connection to a common reference voltage source, such as a ground voltage.

Figure 3:
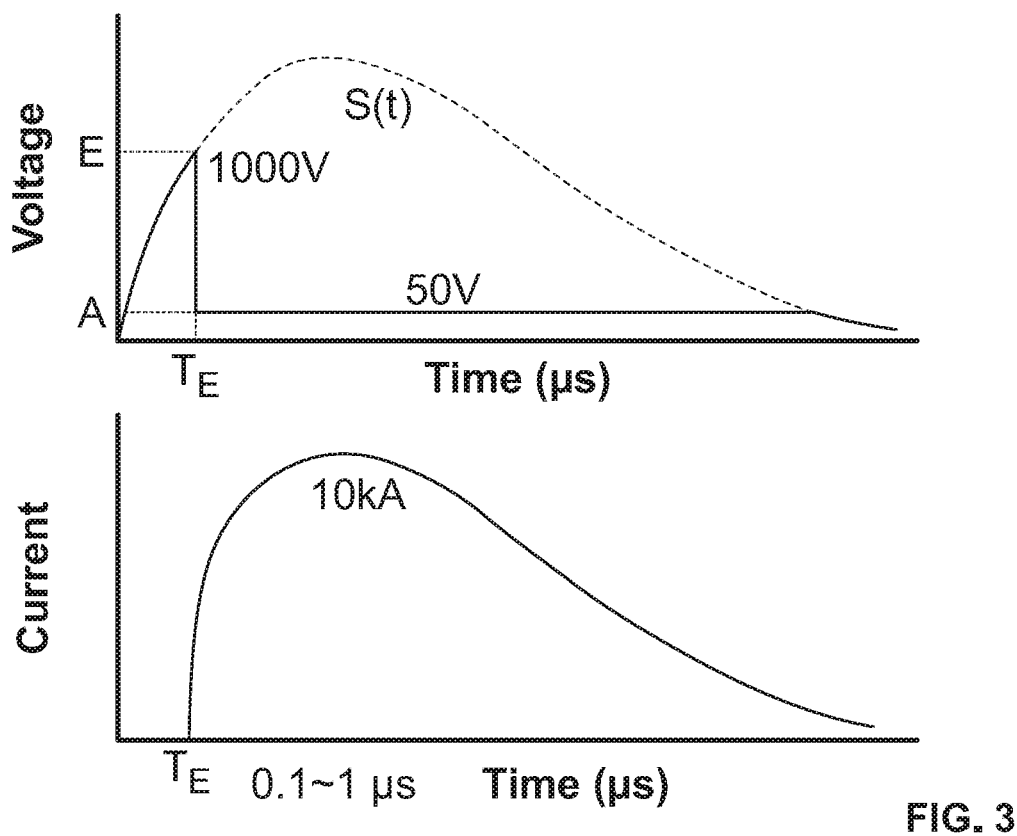
FIGS. 3 and 4 are voltage and current curves for a GDT and a varistor, respectively, in response to a transient overvoltage event in accordance with some embodiments of the inventive concept.

A GDT is a sealed device that contains a gas mixture trapped between two electrodes. The gas mixture becomes conductive after being ionized by a high voltage spike. This high voltage that causes the GDT to transition from a non-conducting, high impedance state to a conducting state is known as the sparkover voltage for the GDT. The sparkover voltage is commonly expressed in terms of a rate of rise in voltage over time. For example, a GDT may be rated so as to have a DC sparkover voltage of 500 V under a rate of rise of 100 V/s. When a GDT experiences an increase in voltage across its terminals that exceeds its sparkover voltage, the GDT will transition from the high impedance state to a state known as the glow region. The glow region refers to the time region where the gas in the GDT starts to ionize and the current flow through the GDT starts to increase. During the glow region, the current through the GDT will continue to increase until the GDT transitions into a virtual short circuit known as the arc region. The voltage developed across a GDT when in the arc region is known as the arc voltage and is typically less than 100 V. A GDT takes a relatively long time to trigger a transition from a high impedance state to the arc region state where it acts as a virtual short circuit. As a result, relatively high voltage transients may not be diverted to ground or other reference terminal and may be passed through to other circuitry. The voltage and current curves for a GDT responding to a transient overvoltage event represented by S(t) is shown in FIG. 3. As shown in FIG. 3, the current through the GDT remains approximately zero until the voltage across the GDT reaches the sparkover voltage level at time $T_E$, which in this example is 1000 V. The GDT then transitions into the arc region where it passes current through as a virtual short circuit and has an arc voltage of 50 V.

Figure 4:
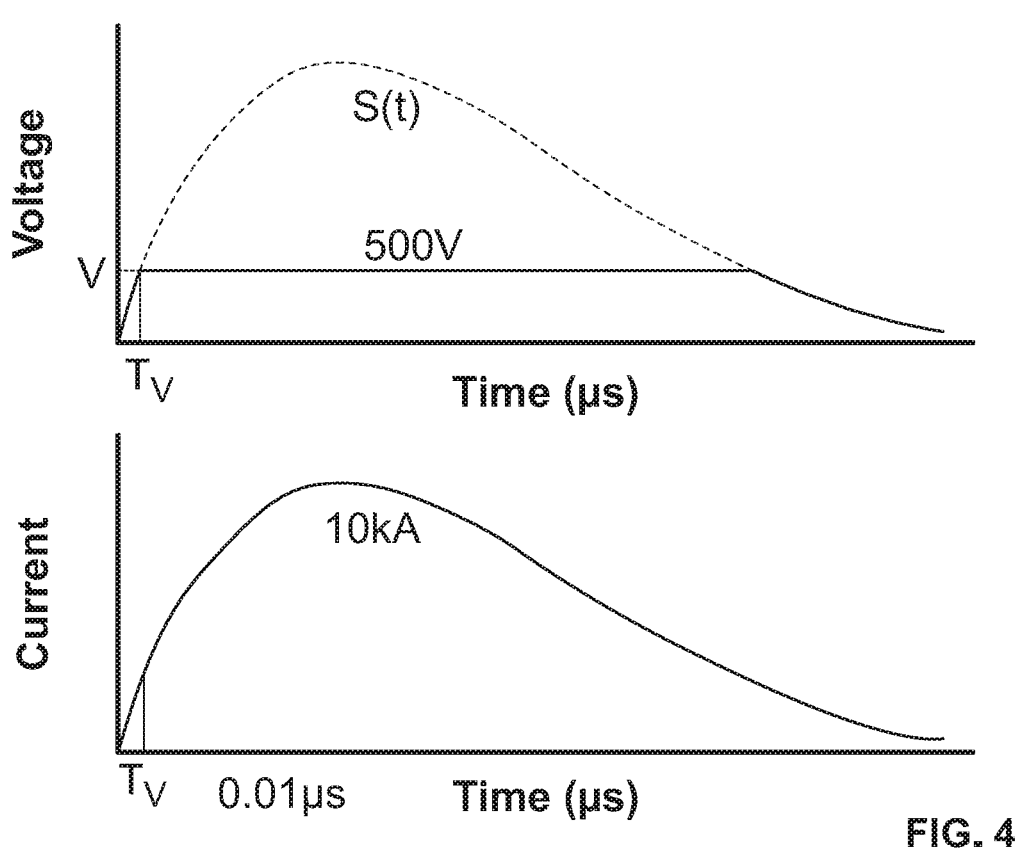

A varistor, such as a metal oxide varistor (MOV), when in a generally non-conductive state still conducts a relatively small amount of current caused by reverse leakage through diode junctions. This leakage current may generate a sufficient amount of heat that a device, such as the thermal disconnect mechanism 605, is used to reduce the risk of damage to components of the overvoltage protection circuit 600. When a transient overvoltage event occurs, a varistor will conduct little current until reaching a clamping voltage level at which point the varistor will act as a virtual short circuit. Typically, the clamping voltage is relatively high, e.g., several hundred volts, so that when a varistor passes a high current due to a transient over voltage event a relatively large amount of power may be dissipated. The voltage and current curves for a varistor responding to a transient overvoltage event represented by S(t) is shown in FIG. 4. As shown in FIG. 4, the varistor clamps the voltage at 500 V at time $T_V$ while acting as a virtual short circuit to allow current to surge through the device in response to the overvoltage event S(t). The voltage developed across the varistor drops below the clamping voltage level once the overvoltage event S(t) drops below the clamping voltage level. In contrast to a GDT, a varistor has a relatively short transition time from a high impedance state to the virtual short circuit state corresponding to the time that it takes for the voltage developed across the varistor to reach the clamping voltage level.

Returning to FIG. 1, if the GDT 610 were used without a current management circuit 620, then the GDT 610 may take a relatively long period of time to transition to the arc region where it acts as a virtual short circuit. Conversely, if the GDT 610 and current management circuit 620 were replaced with a varistor, then the lifetime of the varistor may be shortened as it may carry more leakage current in response to ambient electrical signals carried on the first electrical terminal L. Moreover, a varistor's capacitance typically increases with a varistor's current carrying capability. GDT's have relatively low capacitance relative to varistors. Thus, GDTs may provide improved performance in SPD devices relative to varistors for higher frequency applications, such as Radio Frequency (RF) applications or the like. But the reaction time of varistors is generally very fast, typically in the nanosecond range, while GDTs generally allow more energy to pass by (i.e., pass on the main line without diversion) for a longer period of time (e.g., fractions of a microsecond) before being tripped by the sparkover voltage being exceeded. The overvoltage protection circuit 600 of FIG. 1 may provide operational benefits associated with both GDTs and varistors.

The thermal disconnector mechanism 605 may be configured to disconnect the GDT 610 and current management circuit 620 from the first electrical terminal L in response to a temperature increase that may cause damage to the GDT 610 and/or current management circuit 620 or other components of an SPD that may incorporate the overvoltage protection circuit 600. Example thermally responsive mechanisms 151 and 432 are described below with respect to FIGS. 11 and 19, respectively.

The current management circuit 620 comprises a varistor 625 and a resistor R1 coupled in parallel.

During ambient conditions on the first electrical terminal L, the GDT 610 conducts very little current thereby reducing the leakage current through the varistor 625. As a result, the amount of heat generated in an SPD containing the overvoltage protection circuit 600 may be reduced, the likelihood of the thermal disconnector mechanism 605 being activated to disconnect the GDT 610 and current management circuit 620 from the first electrical terminal L may be reduced, and the longevity of the varistor 625 may be increased.

The varistor 625 clamps the voltage across the nodes of the current management circuit 620 to the clamp voltage. The varistor 625 may be configured to have a clamp voltage that exceeds the ambient voltage level on the first electrical terminal L. This allows the varistor 625 and resistor R1 to extinguish the follow current received through the GDT 610 and allow the GDT 610 to transition out of the arc region and reset back into a non-conductive state. For example, if the arc voltage of the GDT 610 is 50 V and the ambient line voltage is 120 V, then without the varistor 625 the GDT 610 would remain in the arc region and continue to divert current when the signal on the first electrical terminal is in an ambient state after the transient overvoltage event has expired. The varistor 625 clamps the bottom terminal of the GDT 610 to the clamping voltage level of, for example, 500 V, which was developed across the varistor 625 from the transient overvoltage event. When the transient overvoltage event passes and the ambient line voltage returns to 120 V at the first electrical terminal L, the GDT 610 would have a −331 V max developed across its terminals terminating the follow current through the GDT 610 and resetting the GDT 610 back to the non-conducting state. This voltage across the GDT 610 would be at the negative cycle of the ambient voltage at the level of −670 V max without the presence of resistor R1, and up to 170 V max with the presence of resistor R1 because the resistor R1 discharges the capacitance of the varistor 625. As described above, varistors may be characterized by having greater capacitance than GDTs. Once the transient overvoltage event has expired, the resistor R1 may discharge the charge associated with the capacitance of the varistor 625.

Referring now to FIG. 2, an overvoltage protection circuit 700, according to some embodiments of the inventive concept, comprises a thermal disconnector mechanism 705, a GDT 710, and a current management circuit 720 that are coupled in series between a first electrical terminal L and a second electrical terminal C. The thermal disconnector mechanism 705, GDT 710, current management circuit 720, first electrical terminal L, and second electrical terminal C may operate in similar fashion to their respective counterpart elements described above with respect to FIG. 1. The current management circuit 720 differs from the current management circuit 620 in that an inductor L1 is included in series with the resistor R1. As inductors tend to resist changes in current flow, the inductor L1 allows the current flow through the resistor to increase over time based on the time constant given by R1×L1. The inductor L1, therefore, may protect the resistor R1 from a high current surge due to a transient overvoltage event on the line electrically connected to the first electrical terminal L.

In accordance with various embodiments of the inventive concept, the resistor R1 in FIGS. 1 and 2 may be embodied as an axial resistor, radial resistor, Surface Mount Device (SMD) resistor, and/or combinations thereof.

In some embodiments, the inductor L1 has an inductance in a range from about 1 µH to about 1 mH. The inductor L1 may be embodied as a discrete device and/or as a SMD device.

In some embodiments, the varistor 625 of FIG. 1 and the varistor 725 of FIG. 2 have a peak current rating of about 20 kA, a peak voltage rating of about 300 V, and a clamping voltage of about 1500 V. The varistor 625 and the varistor 725 may be embodied as varistors 132 and 452 as described below, in accordance with various embodiments of the inventive concept. Each of the varistors 625 and 725 may be embodied as one or more varistors connected in series or parallel.

In some embodiments, the resistor R1 has a resistance in a range of from about 1 kΩ to 50 MΩ and, in some embodiments, about 1 MΩ.

In some embodiments, the GDT 610 of FIG. 1 and the GDT 710 of FIG. 2 have an impulse sparkover voltage rating of about 1400 V at a rate of rise of about 5 kV/µs and a discharge current rating of about 20 kA. The GDT 610 and the GDT 710 may be embodied as GDTs 140 and 440 as described in accordance with various embodiments of the inventive concept. Each of the GDTs 610 and 710 may be embodied as one or more varistors connected in series or parallel.

The resistor R1 of FIGS. 1 and 2 may be embodied as resistors 180, 280, 480, and 580 as described below in accordance with various embodiments of the inventive concept. The inductor L1 of FIG. 2 may be embodied as inductor 386 described below in accordance with various embodiments of the inventive concept Thus, embodiments of the inventive concept may provide an SPD that includes an overvoltage protection circuit comprising a GDT and a current management circuit including a varistor. The GDT may mitigate current leakage issues associated with the varistor, which may extend the working life of the varistor. The current management circuit including the varistor may facilitate triggering of the GDT in response to a transient overvoltage event while the varistor provides improved energy dissipation and voltage clamping for one terminal of the GDT to extinguish the GDT follow current and allow the GDT to reset to a non-conducting state following the transient overvoltage event.

With reference to FIGS. 6-13, a transient voltage surge suppression (TVSS) or surge protective device (SPD) assembly 101 and an SPD system 103 according to embodiments of the present invention are shown therein. The SPD assembly 101 and system 103 include an SPD module 100 and a pedestal or base 50. The SPD module 100 is pluggable into the base 50.

The SPD module 100 includes the electrical overvoltage protection circuit 600 of FIG. 1. The SPD module 100 may also be modified to further include an inductor corresponding to the inductor L1 such that the modified SPD module 100 includes the overvoltage protection circuit 700 of FIG. 2.

Figure 6:
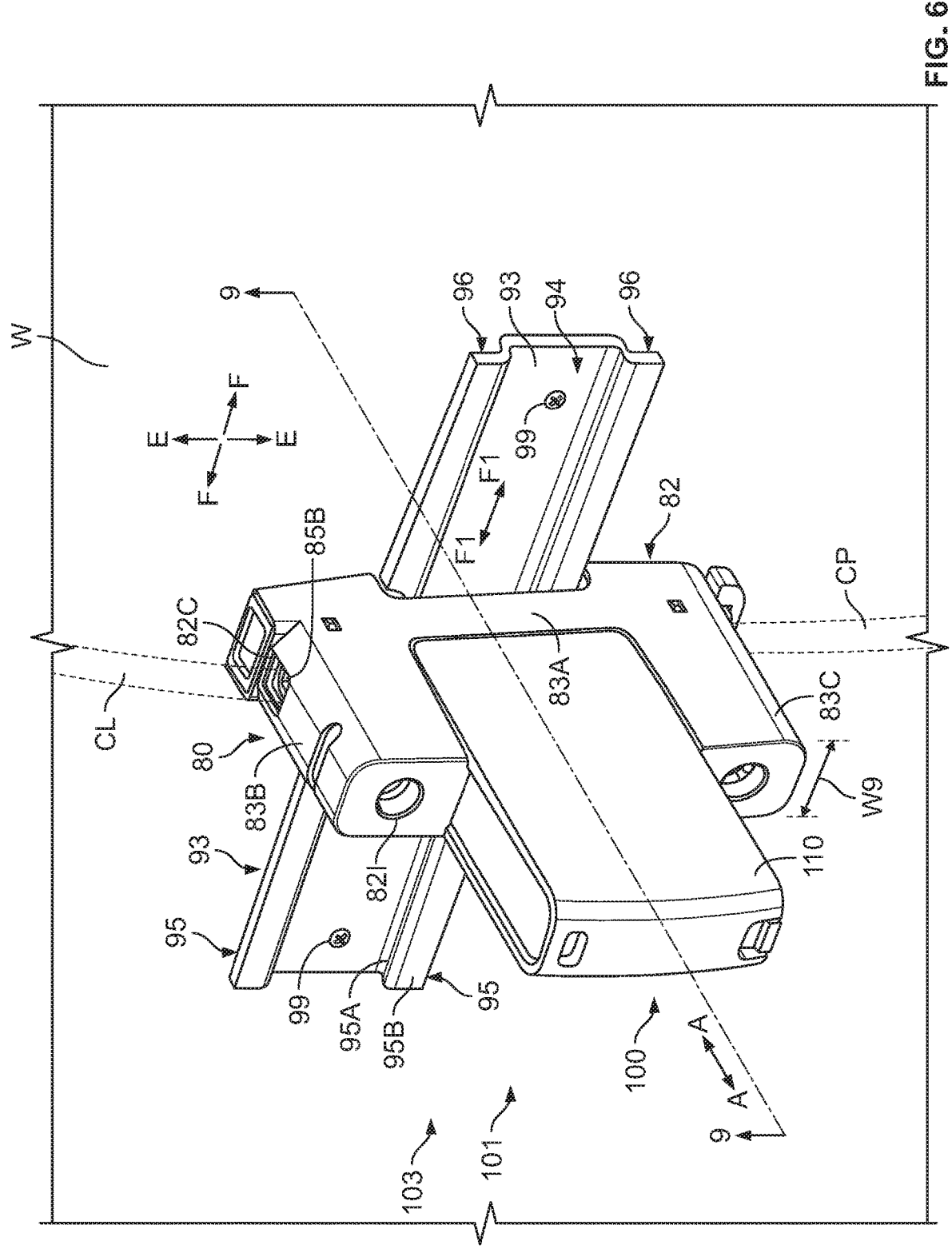
FIG. 6 is a top, front perspective view of an SPD assembly mounted on a DIN rail according to some embodiments of the inventive concept.
Figure 7:
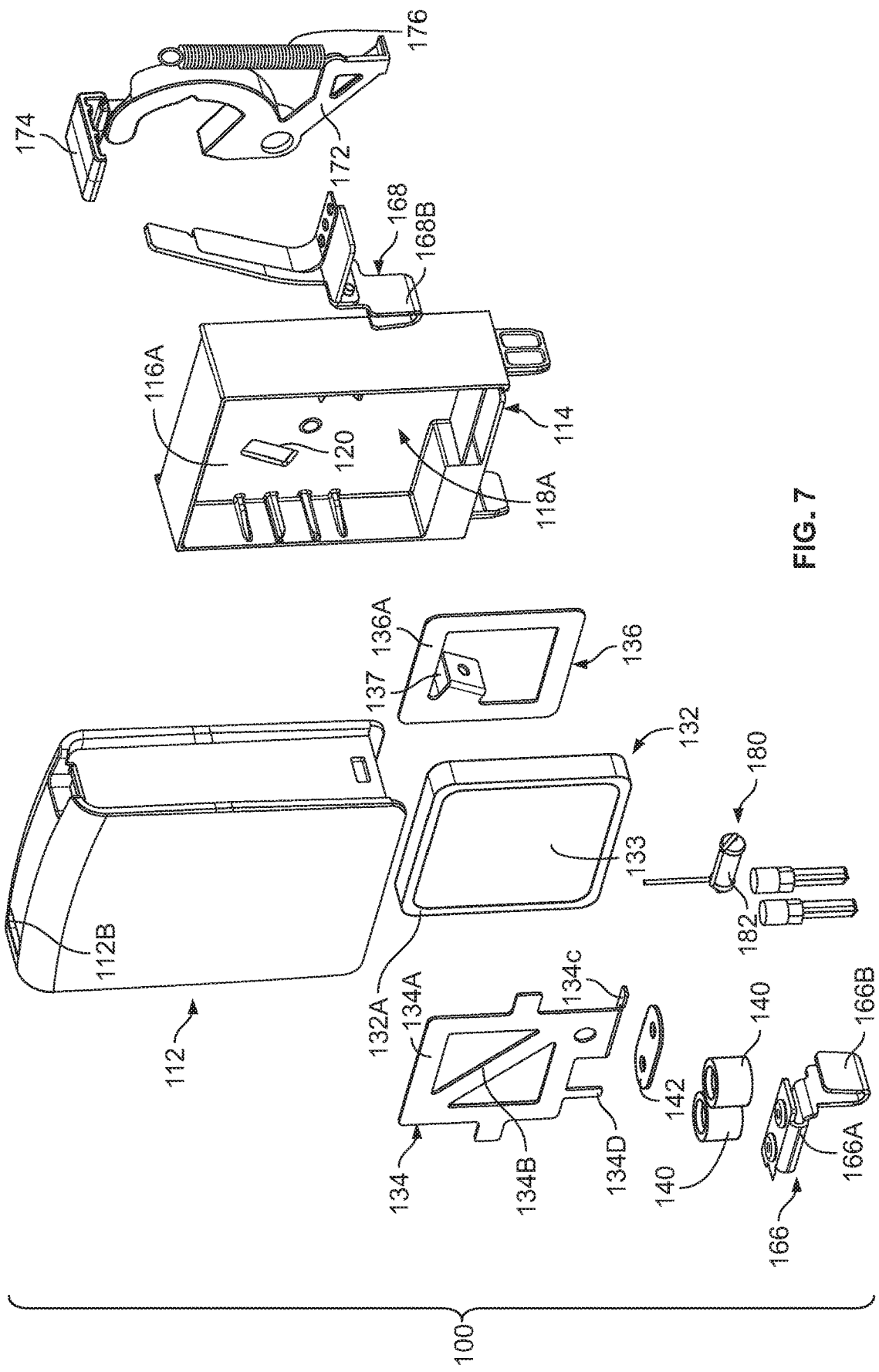
FIGS. 7 and 8 are exploded, perspective views of an SPD module forming a part of the SPD assembly of FIG. 6 according to some embodiments of the inventive concept.

According to some embodiments and as shown, the SPD assembly 101 is configured, sized and shaped for mounting on a support rail 92 (e.g., DIN (Deutsches Institut für Normung e.V.) rail 92 shown in FIG. 6) and is compliant with corresponding applicable DIN requirements or standards. The DIN rail 92 may be secured (e.g., by screws 99 or other fasteners) to a suitable support structure such as a wall W, for example, a rear wall of an electrical service utility cabinet. The base 50 is removably mountable on the DIN rail 92. The pluggable surge protective device (SPD) module 100 is in turn removably mountable on the base 50.

In some embodiments, the maximum dimensions of the SPD assembly 101 are compliant with at least one of the following DIN (Deutsches Institut für Normung e.V.) Standards: DIN 43 880 (December 1988). In some embodiments, the maximum dimensions of the assembly 101 are compliant with each of these standards.

According to some embodiments and as shown, the rail 92 is a DIN rail. That is, the rail 92 is a rail sized and configured to meet DIN specifications for rails for mounting modular electrical equipment.

The DIN rail 92 has a rear wall 93 and integral, lengthwise flanges 95 extending outwardly from the rear wall 93. Each flange 95 includes a forwardly extending wall 95A and an outwardly extending wall 95B. The walls 93, 95 together form a lengthwise extending front, central channel 94 and opposed, lengthwise extending, rear, edge channels 96. Mounting holes may be provided extending fully through the wall 93 and to receive fasteners 99 (e.g., threaded fasteners or rivets) for securing the rail 92 to a support structure (e.g., a wall or panel). The DIN rail 92 defines a DIN rail plane E-F and has a lengthwise axis F1-F1 extending in the plane E-F. DIN rails of this type may be referred to as "top hat" support rails.

According to some embodiments, the rail 92 is a 35 mm (width) DIN rail. According to some embodiments, the rail 92 is formed of metal and/or a composite or plastic material.

The assembly 100 has a DIN rail device assembly axis A-A (FIG. 6) that extends transversely to and, in some embodiments, substantially perpendicular to the axis F1-F1 of the DIN rail 92. In some embodiments, the DIN rail mount assembly axis A-A extends transversely to and, in some embodiments, substantially orthogonal to the plane E-F of the DIN rail 92. As used herein, "front" or "distal" refers to the end farther away from the DIN rail 92 when the assembly 101 is mounted on the DIN rail 92, and "rear" or "proximal" refers to the end nearer the DIN rail 92.

The base 80 (FIGS. 6 and 13) includes a housing 82. The housing 82 includes a rear section 83A, an upper leg or section 83B, and a lower leg or section 83C. The housing 82 defines an enclosed internal cavity. According to some embodiments, the housing 82 is formed of an electrically insulating polymeric material. The housing 82 may be formed of any suitable material or materials. In some embodiments, the housing 82 is formed of a rigid polymeric material or metal (e.g., aluminum). Suitable polymeric materials may include polyamide (PA), polypropylene (PP), polyphenylene sulfide (PPS), or ABS, for example.

A DIN rail receiver channel 82F is defined in the rear side of the rear section 83A. Integral rail hook features 82H are located on one side of the channel 82F and a spring loaded DIN rail latch mechanism 82G is mounted on the other side of the channel 82F. The features and components 82F, 82G, 82H are sized and configured to securely and releasably mount the base 80 on a standard DIN rail 92 as is known in the art.

A receiver slot 83D is defined in the front side of the base 80 by the sections 83A-C. The receiver slot 83D has a front opening and is open on either side. The receiver slot 83D extends axially from the opening along the axis A-A and is terminated by the front side of the rear section 83A.

A base terminal electrical connector assembly 84, 86 is mounted in each of the upper and lower sections 83B, 83C. Each connector assembly 84, 86 includes a cable clamp connector 85A and a terminal contact connector socket 85B. A cable port 82C is defined in each of the upper and lower sections 83B, 83C to receive a terminal end of an electrical cable CL, CP into the corresponding cable clamp connector 85A. A driver port 82I is provided in each section 83B, 83C to receive a driver to operate a threaded member (e.g., screw) 85D of the associated cable clamp connector 85A.

Upper and lower contact openings 82E are defined in the front side or wall of the rear section 83A.

A switch 88 is disposed in the housing 82. The switch 88 includes a spring-loaded remote control pin 88A that projects forwardly from the front side of the rear section 83A. The switch 88 further includes switch electronics mounted on a PCB and connected to the control pin 88A and an output electrical connector.

The SPD module 100 includes a housing 110, an overvoltage clamping element subassembly 130, an integral thermal disconnector mechanism 151, an integral indicator mechanism 170 (including a local alarm mechanism 107, and a remote alarm mechanism 108), a first fail-safe mechanism 102, and a second fail-safe mechanism 104 disposed in the housing 110, as discussed in more detail below. The SPD module 100 further includes potting P (shown only in FIG. 9), a first electrical contact member 166, and a second electrical contact member 168.

The housing 110 includes an inner housing member or frame 114 and an outer housing member or cover 112 collectively forming the housing 110. The housing 110 defines an internal chamber or cavity.

A front indicator opening or window 112B is provided on a front wall of the cover 112. The indicator window 112B may serve to visually indicate a change in status of the module 100, as discussed below.

The frame 114 includes a partition wall 116A separating the cavity of the housing 110 into opposed cavities 118A and 118B. An electrical conductor or electrode slot 120 is defined in the partition wall 116A and connects the cavities.

The housing members 112, 114 may be formed of any suitable material or materials. In some embodiments, each of the housing members 112, 114 is formed of a rigid polymeric material. Suitable polymeric materials may include polyamide (PA), polypropylene (PP), polyphenylene sulfide (PPS), or ABS, for example.

In some embodiments and as shown, the overvoltage clamping element subassembly 130 includes a varistor 132, a first electrode 134 (also referred to herein as the "ground electrode"), a second electrode 136 (also referred to herein as the "disconnect electrode"), two gas discharge tubes (GDT) 140, a GDT electrode or contact plate 142, and an electrical resistor 180.

The varistor 132 has opposed contact surfaces 132A, 132B. Metallization layers 133 may cover the contact surfaces 132A, 132B.

The thickness of each of the varistor 132 and the diameters of its contact surfaces 132A, 132B will depend on the varistor characteristics desired for the particular application. In some embodiments, the varistor 132 has a width W1 (FIG. 10) to thickness T1 (FIG. 9) ratio of at least 2. In some embodiments, the thickness T1 of the varistor 132 is in the range of from about 0.75 to 15 mm.

The varistor material of the varistor 132 may be any suitable material conventionally used for varistors, namely, a material exhibiting a nonlinear resistance characteristic with applied voltage. In some embodiments, the varistor 132 is a metal oxide varistor (MOV). In some embodiments, the resistance becomes very low when a prescribed voltage is exceeded. The varistor material may be a doped metal oxide or silicon carbide, for example. Suitable metal oxides include zinc oxide compounds.

The first or ground electrode 134 includes a perimeter portion 134A, a cross or brace leg 134B, an integral terminal tab 134C, and an integral resistor connection tab 134D. The portions 134A and 134B collectively form a contact portion. The ground electrode 134 is electrically conductive. In some embodiments, the ground electrode 134 is formed of metal. Suitable metals may include nickel brass or copper alloys such as CuSn 6 or Cu-ETP. In some embodiments, the ground electrode 134 is unitary (composite or monolithic) and, in some embodiments, the ground electrode 134 is monolithic.

The second or disconnect electrode 136 includes a perimeter portion 136A, and a terminal tab 137. The portions 136A forms a contact portion and the terminal tab 137 forms an extension portion.

The terminal tab 137 has a substantially planar contact surface 137A defining a tab plane. In some embodiments, the tab plane is transverse to and, in some embodiments, substantially orthogonal to the plane defined by the contact surface 132B.

The disconnect electrode 136 is electrically conductive. In some embodiments, the disconnect electrode 136 is formed of metal. Suitable metals may include nickel brass or copper alloys such as CuSn 6 or Cu-ETP In some embodiments, the disconnect electrode 136 is unitary (composite or monolithic) and, in some embodiments, the disconnect electrode 136 is monolithic.

Figure 8:
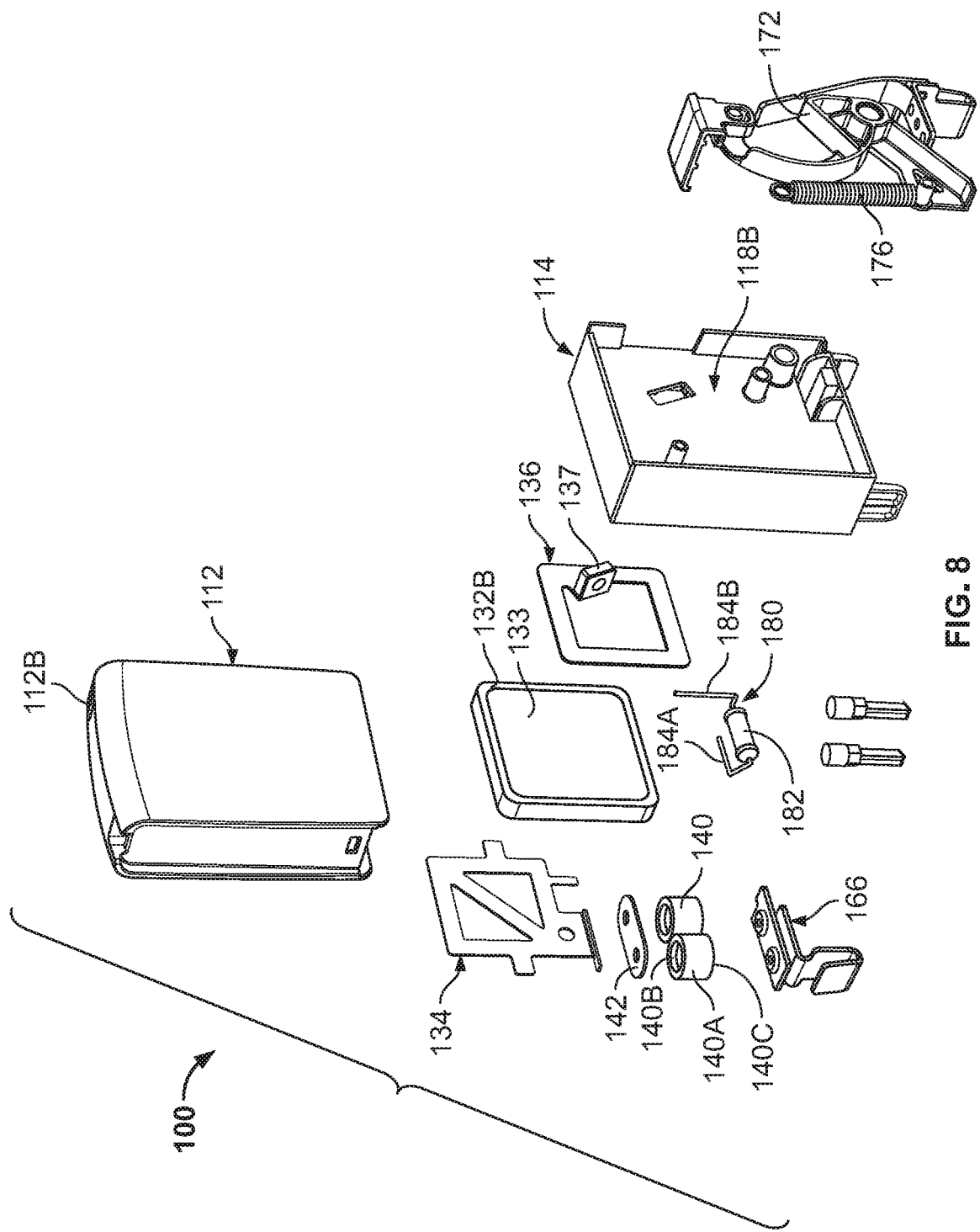

The resistor 180 corresponds to the resistor R1 of FIG. 1 or FIG. 2. The resistor 180 may be a through hole resistor including a resistor body 182 and opposed leads 184A, 184B. The resistor 180 may be an axial lead resistor as shown in FIG. 8 or of another configuration (e.g., a radial lead resistor).

The resistor lead 184A is mechanically and electrically connected to the tab 134D. The resistor lead 184B is mechanically and electrically connected to the metallization layer 133 of the contact surface 132B. In some embodiments, the leads 184A and 184B are soldered to the tab 134D and the metallization layer 133 of the surface 132B.

Suitable through hole resistors for the resistor 180 may include the metal film resistor type HVR3700001004JR500 rated at 1 MΩ available from Vishay of USA.

The ground electrode 134 and the disconnect electrode 136 are mounted on the outer surfaces 132A and 132B of the varistor 132. More particularly, the ground electrode 134 is bonded to the metallization layer 133 of the contact surface 132A by solder and the disconnect electrode 136 is bonded to the metallization layer 133 of the contact surface 132B by solder so that the electrodes 134 and 136 are electrically connected to the contact surfaces 132A and 132B, respectively.

The terminal tab 137 serves as an electrical conductor that extends laterally through the hole 120 in the frame 114. A section of the terminal tab 137 projects laterally a prescribed extension distance laterally beyond the surface 132B of the varistor 132.

The overvoltage clamping element subassembly 130 is contained in the cavity 118A such that the terminal tab 137 extends through the slot 120 and into the cavity 118B. The otherwise unoccupied space in the cavity 118A is filled with the potting P.

Each GDT 140 includes a body 140A and an anode terminal 140B and a cathode terminal 140C on opposed ends of the body 140A. The body 140A contains an anode, a cathode and a spark gap chamber as is known in the art.

In some embodiments and as shown, each GDT 140 is cylindrically shaped. An annular electrical insulator (e.g., ceramic) may surround the body 140A between the terminals 140B, 140C.

In some embodiments, the body 140A includes a hermetically or gas-tight sealed chamber or cell in which a selected gas is contained. The terminals 140B, 140C are electrically connected to the gas (e.g., by respective electrode portions in fluid contact with the contained gas). Below a prescribed spark over the voltage, the GDT 140 is electrically insulating between the terminals 140B, 140C. When an applied voltage across the terminals 140B, 140C exceeds the prescribed spark over voltage, the contained gas is ionized to cause electrical current to flow through the gas (by the Townsend discharge process) and thereby between the terminals 140B, 140C. Thus, the GDT 140 will selectively electrically insulate or conduct, depending on the applied voltage. The voltage required to initiate and sustain electrical conduction (discharge) will depend on the design characteristics of the GDT 140 (e.g., geometry, gas pressure, and gas composition).

In some embodiments, each GDT 140 has surge current and energy withstand capabilities at least as great as those of the MOV varistor wafer 132 (combined) used in series with the GDTs 140.

Suitable GDTs may include Class I and Class II GDTs. Suitable GDTs may be rated at impulse currents from 5 kA to 100 kA and maximum continuous operating voltage from 60 V to 1200 V. Suitable GDTs may include the Surge Arrestor Type A80-A500XTP rated at 500 V GDT available from TDK-EPC Corporation of Japan.

The contact plate 142 is electrically conductive. In some embodiments, the contact plate 142 is formed of metal. Suitable metals may include nickel brass or copper alloys such as CuSn 6 or Cu-ETP.

The contact plate 142 is mechanically secured and electrically connected to the ground electrode 134 by solder, for example. The anode terminal 140B of each GDT 140 is mechanically secured and electrically connected to the contact plate 142 by solder, for example.

Figure 12:
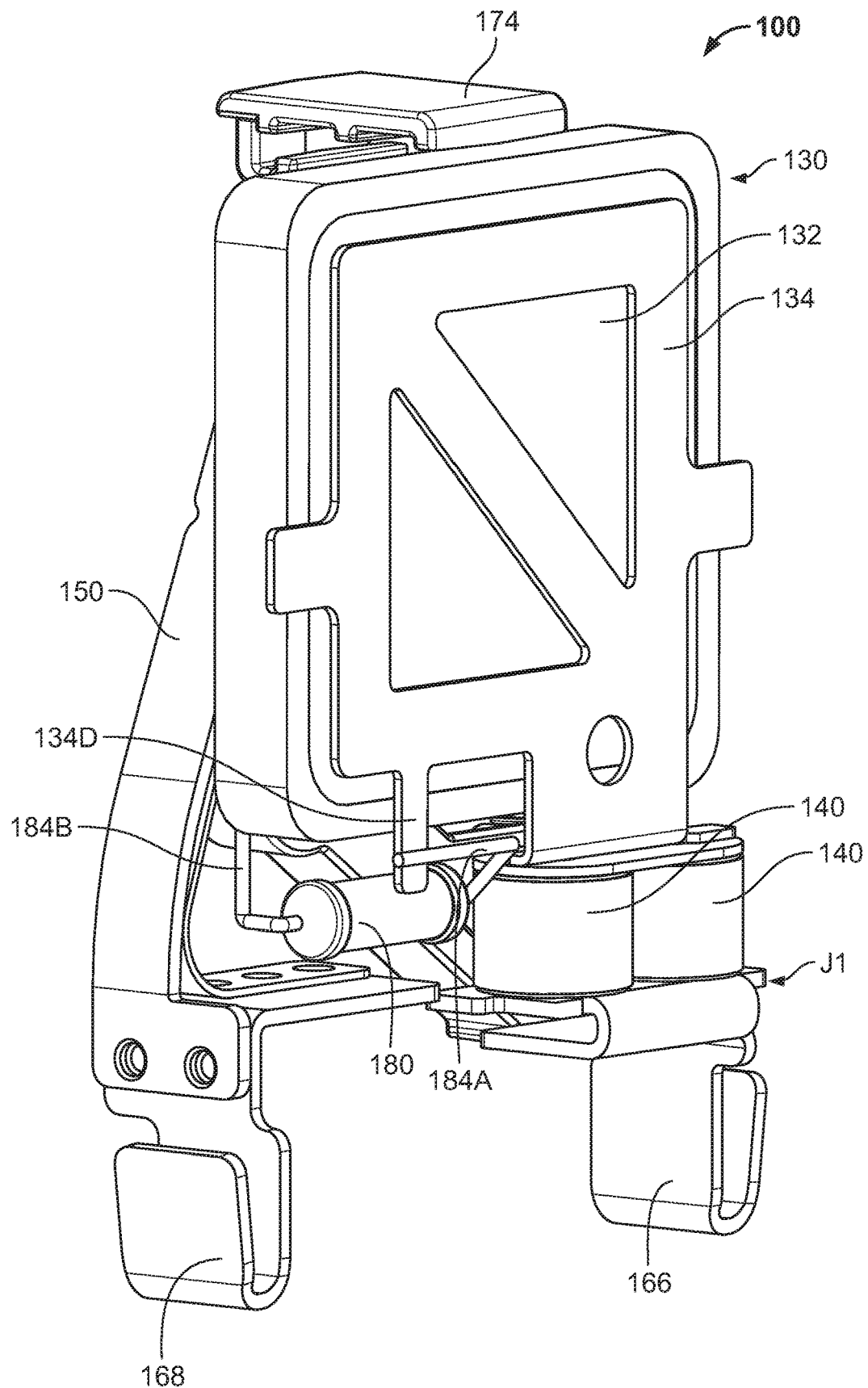
FIG. 12 is a front perspective view of the SPD module of FIG. 7 with the cover removed.
Figure 13:
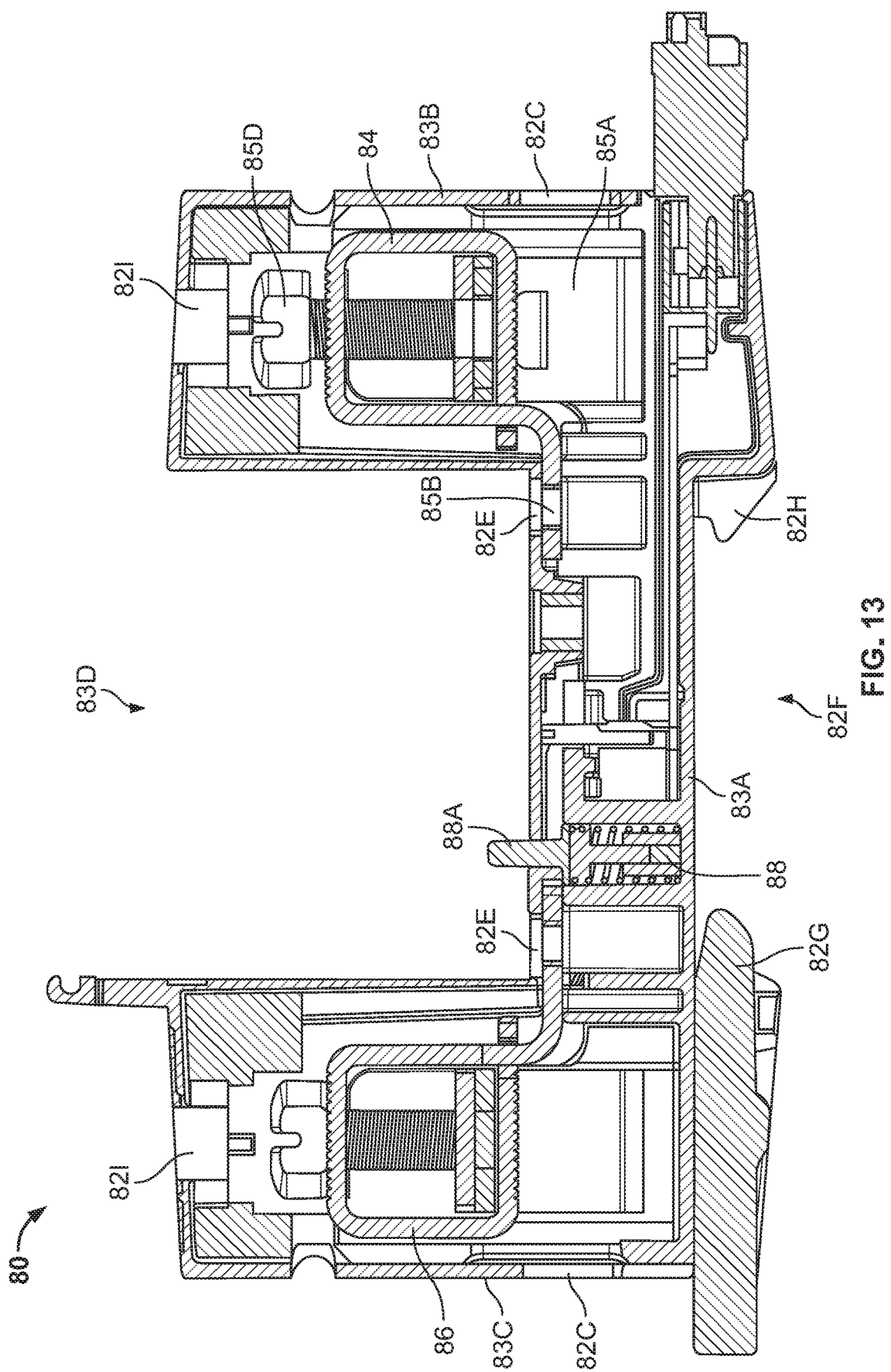
FIG. 13 is a cross-sectional view of a base assembly forming a part of the SPD assembly of FIG. 6.

The first electrical contact member 166 (FIG. 7) includes a base 166A and an integral U-shaped module terminal connector 166B. The cathode terminal 140C of each GDT 140 is mechanically secured and electrically connected to the base 166A by solder or welding, for example, at a joint J1 (FIG. 12).

The GDTs 140 are thus connected in electrical parallel between the varistor 132 and the contact member 166.

The relative positions of the ground electrode 134 and the base 166A can be adjusted or varied when forming the joint J1 during manufacture. For example, the lateral position of the contact member 166 relative to the ground electrode 134 can be adjusted and then secured (e.g., by solder or welding) to accommodate a varistor 132 of a different thickness. This floating contact or joint can allow varistors 132 of different thicknesses to be assembled using the same ground electrode 134.

The contact member 166 may be formed of any suitable material or materials. In some embodiments, the contact member 166 is formed of metal. Suitable metal materials may include nickel brass, CuSn 0.15, CuSN 6, CuP 0.008, for example. In some embodiments, the contact member 166 is unitary and, in some embodiments, is monolithic.

The thermal disconnector mechanism 151 includes a disconnect spring 150 and a layer of solder 159.

The disconnect spring 150 includes a cantilevered free leg. The free leg includes a lower portion 154A and an upper contact portion 154B. The contact portion 154B includes an inner contact face facing the terminal tab 137. A weak region 156 is located in the spring 150 between the lower portion 154A and the contact portion 154B. The weak region 156 may include a notch defined in the side edge of the spring 150. As a result, the spring 150 has a reduced cross-sectional area at the weak region 156.

The spring 150 may be formed of any suitable electrically conductive material or materials. In some embodiments, the spring 150 is formed of metal. Suitable metal materials may include CuSn 0.15 alloy (bronze), nickel brass, CuSn6, Cu-ETP, oxygen free copper, for example. According to some embodiments, the spring 150 has a restoring force in the ready position (FIG. 11) in the range of from about 5 N to 50 N. According to some embodiments, the spring 150 has an electrical conductivity of at least 14 nΩ·m (at 20° C.).

The second electrical contact member 168 (FIG. 7) includes an integral U-shaped module terminal connector 168B. The spring 150 is secured to the contact member 168 (e.g., by rivets). The contact member 168 may be formed of any suitable material or materials. In some embodiments, the contact member 168 is formed of metal. Suitable metal materials may include nickel brass, CuSn 0.15, CuSN 6, CuP 0.008, for example. In some embodiments, the contact member 168 is unitary and, in some embodiments, is monolithic.

The solder 159 may be formed of any suitable material or materials. In some embodiments, the solder 159 is formed of metal. Suitable metal materials may include 58Bi42Sn for example.

According to some embodiments, the solder 159 is selected such that its melting point is greater than a prescribed maximum standard operating temperature, but less than or equal to a prescribed disconnect temperature. The maximum standard operating temperature may be the greatest temperature expected in the solder 159 during normal operation (including handling overvoltage surges within the designed for range of the module 100). The prescribed disconnect temperature is the temperature of the solder 159 at with the solder 159 is intended to release the spring 150 in order to actuate the first fail-safe mechanism 102.

According to some embodiments, the solder 159 has a melting point in the range of from about 109° C. to 160° C. and, in some embodiments, in the range of from about 85° C. to 200° C.

The indicator mechanism 170 includes a swing arm 172, an indicator shuttle or member 174, and an indicator spring 176. The indicator member 174 is slidably secured to the rail or front wall of the frame 116 to slide along an indicator axis I-I (FIG. 11).

The indicator spring 176 is elastically stretched so that it exerts a persistent pull force on the swing arm 172.

Figure 9:
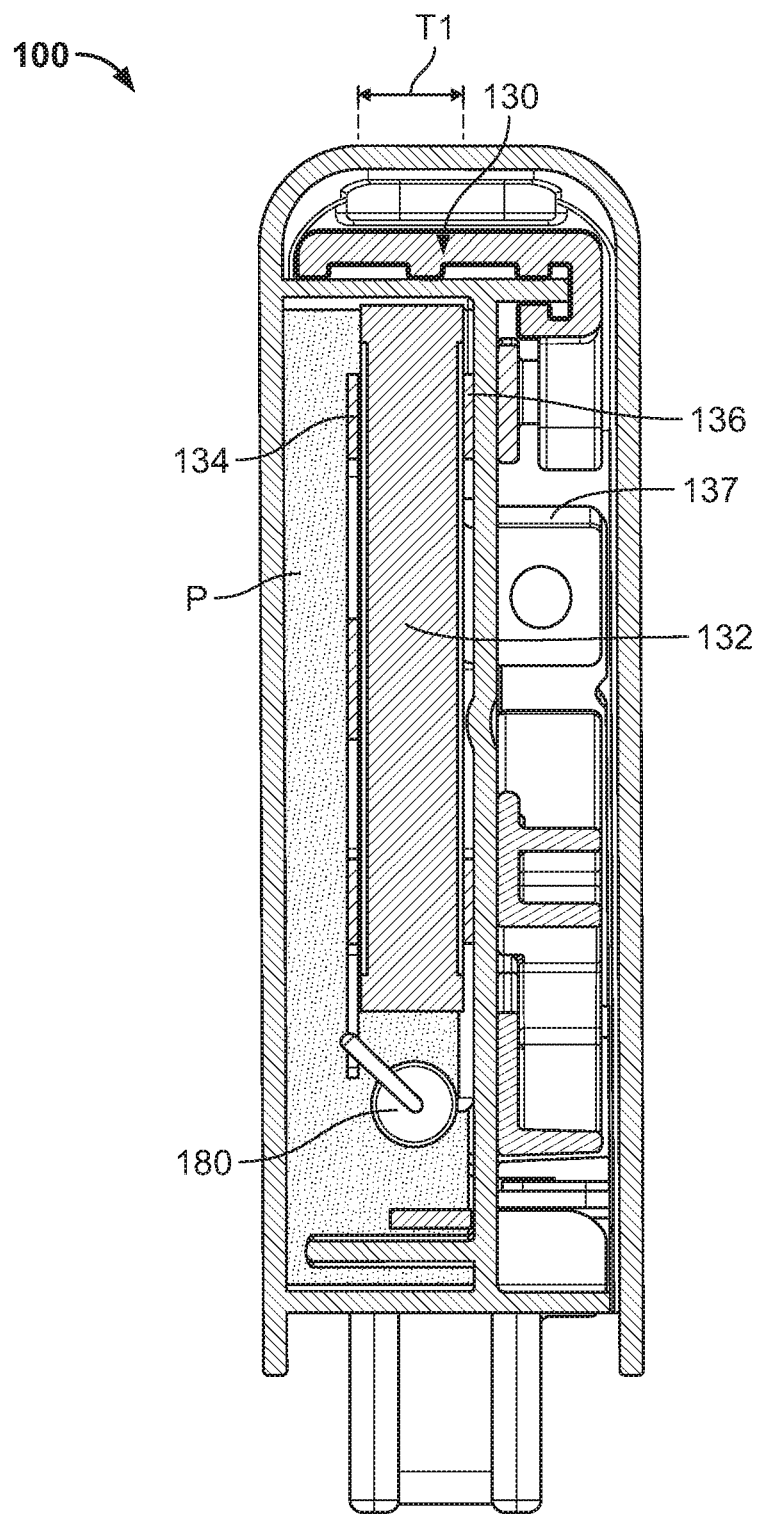
FIG. 9 is a cross-sectional view of the SPD module of FIG. 7 taken along the line 9-9 of FIG. 6.
Figure 10:
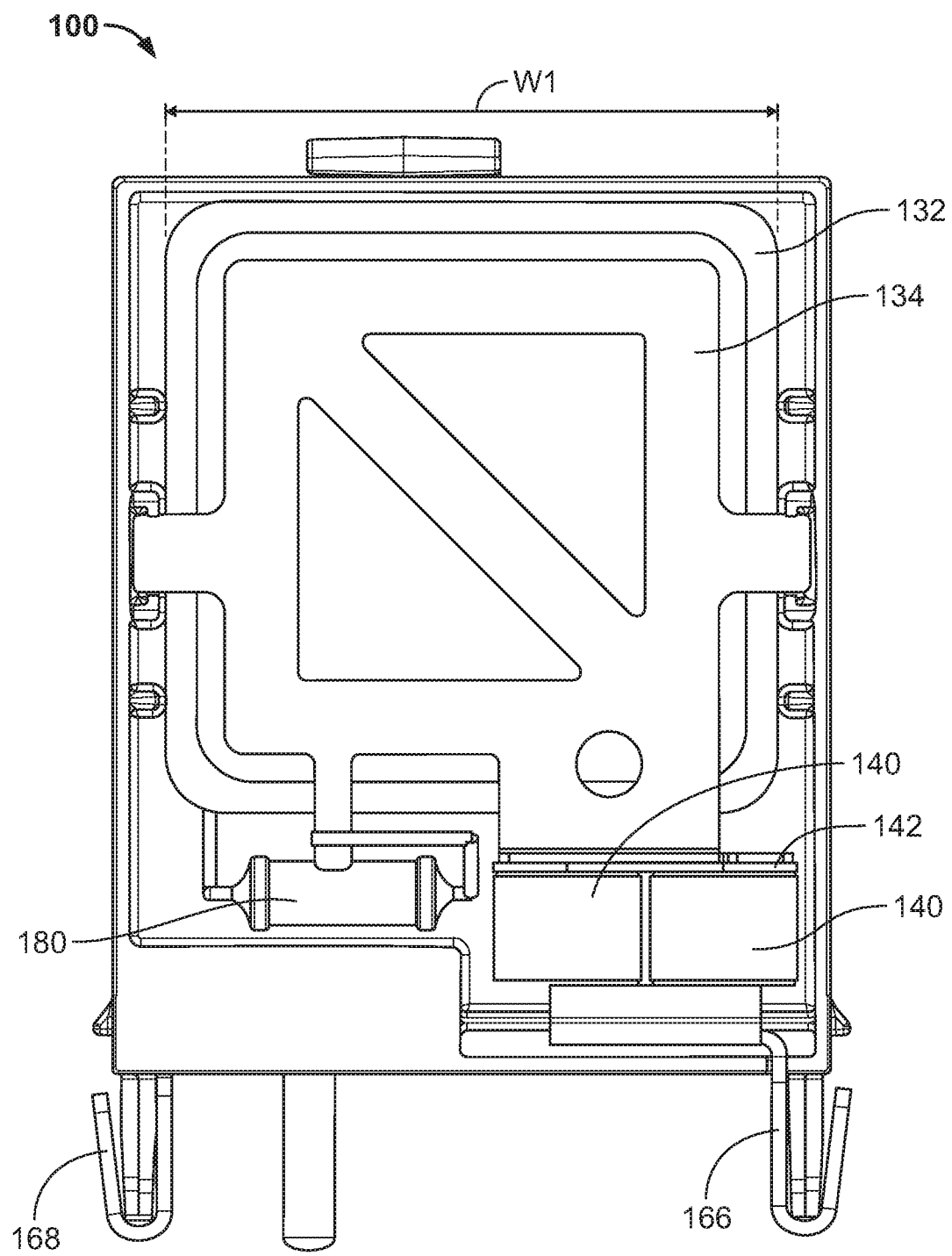
FIG. 10 is a first side elevation view of the SPD module of FIG. 7 with a cover thereof removed.
Figure 11:
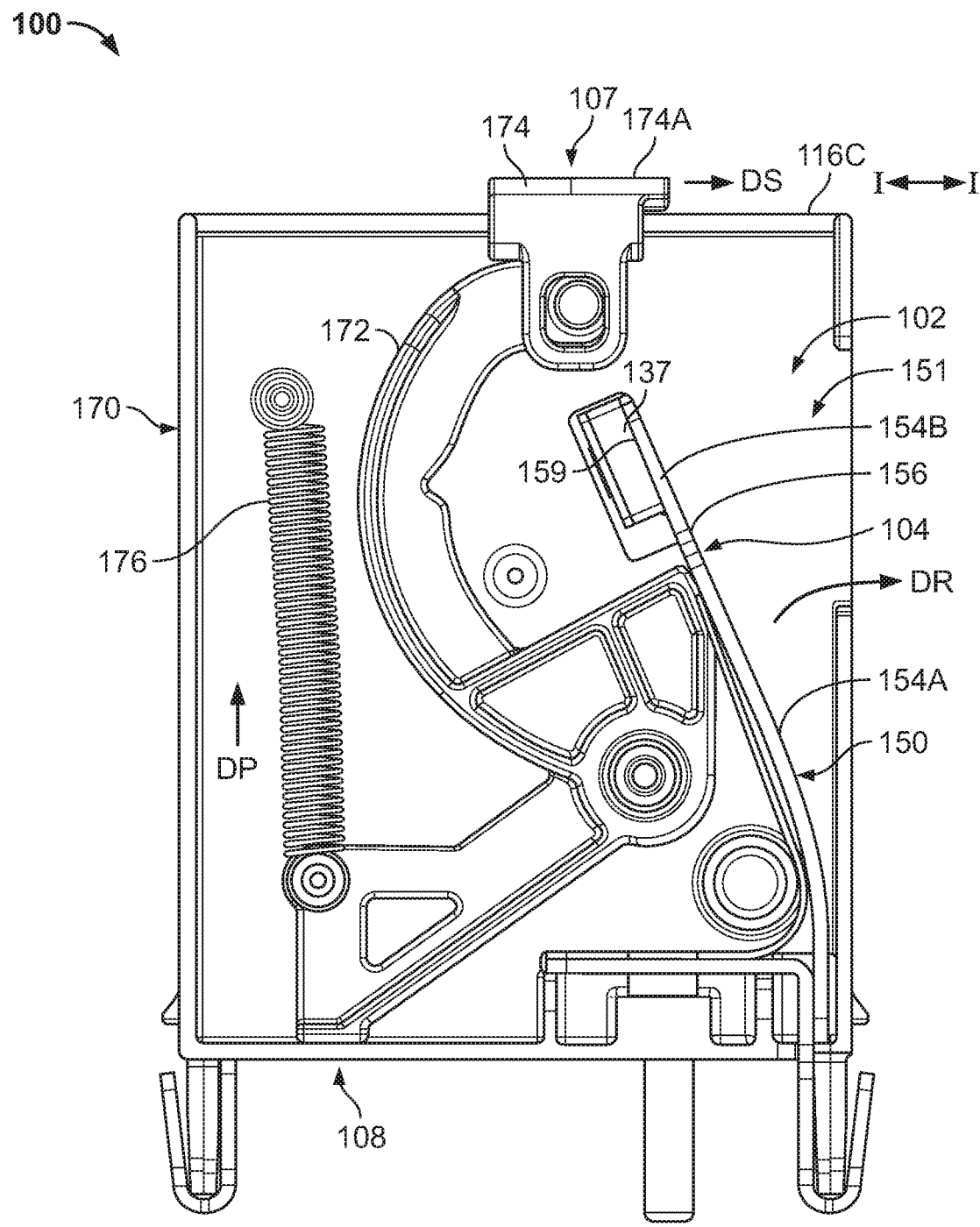
FIG. 11 is an opposing side elevation view of the SPD module of FIG. 7 with the cover removed that illustrates a thermal disconnector mechanism of the SPD module in a ready configuration.

When the module 100 is assembled in the ready configuration as shown in FIGS. 9-11, the disconnect spring 150 is elastically bent, deformed or deflected so that it persistently exerts a biasing load on the solder 159 pulling away from the terminal tab 137 in a release direction DR.

In the ready configuration, the swing arm 172 is locked in the position shown in FIG. 11 by the disconnect spring 150. The indicator spring 176 is elastically extended or stretched so that it persistently exerts a biasing load pulling the swing arm 172 in a pivot direction DP (i.e., toward the front wall 116B). The indicator member 174 is thereby secured in the ready position wherein the indicator surface of the indicator member 174 is not aligned with and visible through the window 112B.

The electrical circuit formed by the module 100 is schematically represented in FIGS. 1 and 2 as the overvoltage protection circuits 600 and 700, respectively.

The system 101 may be used as follows in accordance with methods of the present invention.

Figure 5:
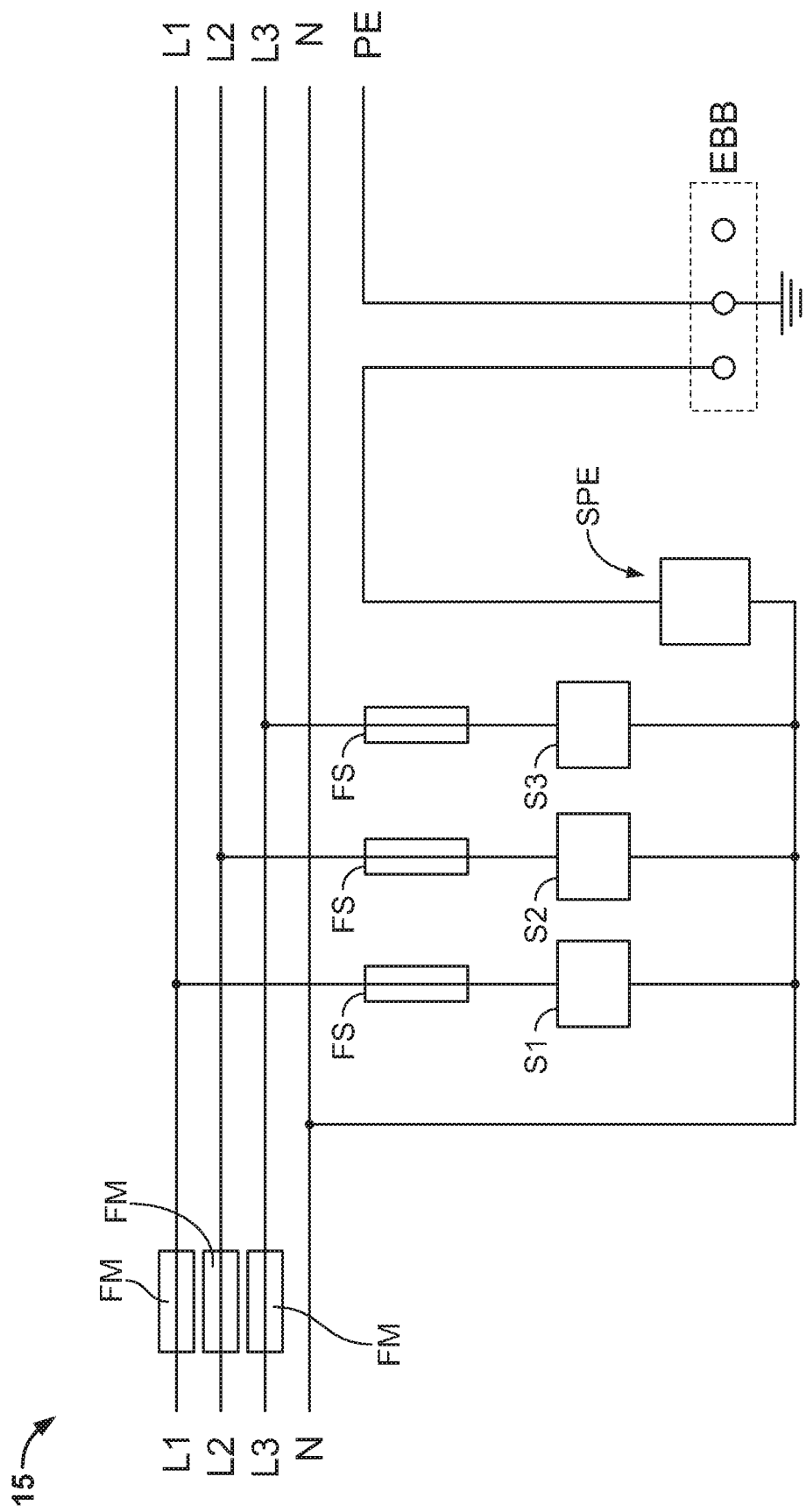
FIG. 5 is an electrical schematic of an electrical circuit including the SPD assembly of FIG. 6 according to some embodiments of the inventive concept.

With reference to FIG. 5, an exemplary electrical circuit 15 in which one or more SPD assemblies 101 may be used is shown therein. The SPD assemblies 101 may be mounted on a DIN rail 92 (FIG. 6). The illustrated circuit 15 is a three phase system using a "3+1" protection configuration. In the illustrated circuit 15, there are three SPD assemblies 101 (designated S1, S2, S3, respectively) each connected between a respective line L1, L2, L3 and N (i.e., L-N). An additional SPD module SPE is connected between N and PE (i.e., N-PE). The SPD module SPE may be connected to PE through a local ground terminal EBB (e.g., an equipotential bonding bus bar). The SPD module SPE may also be an SPD assembly 101 as described herein. Each line L1, L2, L3 may be provided with a main circuit breaker or fuse FM and an external disconnector such as a supplemental fuse FS between the line and its SPD assembly S1, S2, S3. In other embodiments, one or more of the SPD assemblies S1, S2, S3, SPE may be of a different construction than the SPD assembly 101 as disclosed herein.

Operation of the SPD assembly S1 and conditions or transient overvoltage events on the line L1 will be described hereinbelow. However, it will be appreciated that this description likewise applies to the SPD assemblies S2, S3 and the lines L2, L3.

In use, the base 80 is mounted on the DIN rail 92 as shown in FIG. 6. The DIN rail 92 is received in the channel 82F and secured by the hooks 82H and the latch mechanism 82G.

Cables CL, CP (shown in dashed line in FIG. 6) are inserted through the cable ports 82C and secured in the clamp connectors 85A. In some embodiments, the cable CL is connected to the line L1 and the cable CP is connected to Protective Earth (PE).

The module 100 is then axially plugged or inserted into the receiver slot 83D in an insertion direction along the axis A-A through the front opening. The module 100 is pushed back into the receiver slot 83D until the rear end of the module 100 substantially engages the front side of the rear housing section 83A, as shown in FIG. 6.

Insertion of the module 100 into the slot 83D causes the terminals 166B and 168B to be inserted into the sockets 85B of the connector assemblies 84 and 86 along an insertion axis I-I.

Because the thermal disconnector mechanism 151 is in its ready position, the indicator member 174 is held in a retracted position (FIG. 11). Additionally, when the module 100 is inserted into the receiver slot 83D, the remote control pin 88A is thereby depressed by the end of the swing arm 172 that covers the port 122. The module 100 thereby provides feedback through the depressed remote control pin 88A that the module 100 has been seated in the base 80 and the module 100 is in its ready or operational (non-failed) condition.

The module 100 can be released and removed from the base 80 by executing a reverse of the foregoing procedure. The foregoing steps of mounting and removing the module 100 or other suitably configured modules in and from base 80 can be repeated multiple times. For example, in the event that the varistor 132 of the module 100 is degraded or destroyed or no longer of proper specification for the intended application, the module 100 can be replaced with a fresh or suitably constructed module.

In case of a failure of the varistor 132, a fault current will be conducted between the corresponding line (e.g., Line L1 of FIG. 5) and the neutral line N. As is well known, a varistor has an innate nominal clamping voltage VNOM (sometimes referred to as the "breakdown voltage" or simply the "varistor voltage") at which the varistor begins to conduct current. Below the VNOM, the varistor will conduct practically no current. Above the VNOM, the varistor will conduct a current (i.e., a leakage current or a surge current). The VNOM of a varistor is typically specified as the measured voltage across the varistor with a DC current of 1 mA.

As is well known, a varistor has three modes of operation. In a first normal mode (discussed above), up to a nominal voltage, the varistor is practically an electrical insulator. In a second normal mode (also discussed above), when the varistor is subjected to an overvoltage, the varistor temporarily and reversibly becomes an electrical conductor during the overvoltage condition and returns to the first mode thereafter. In a third mode (the so-called end of life mode), the varistor is effectively depleted and becomes a permanent, non-reversible electrical conductor.

The varistor also has an innate clamping voltage VC (sometimes referred to as simply the "clamping voltage"). The clamping voltage VC is defined as the maximum voltage measured across the varistor when a specified current is applied to the varistor over time according to a standard protocol.

In the absence of an overvoltage condition, the varistor 132 provides high resistance such that approximately no current flows through the module 100 as it appears electrically as an open circuit. That is, ordinarily each varistor passes approximately no current. In the event of an overcurrent surge event (typically transient; e.g., lightning strike) or an overvoltage condition or event (typically longer in duration than an overcurrent surge event) exceeding VNOM, the resistance of the varistor wafer decreases rapidly, allowing current to flow through the module 100 to create a shunt path for current flow to protect other components of an associated electrical system. Normally, the varistor recovers from these events without significant overheating of the module 100.

Varistors have multiple failure modes. The failure modes include: 1) the varistor fails as a short circuit; and 2) the varistor fails as a linear resistance. The failure of the varistor to a short circuit or to a linear resistance may be caused by the conduction of a single or multiple surge currents of sufficient magnitude and duration or by a single or multiple continuous overvoltage events that will drive a sufficient current through the varistor.

A short circuit failure typically manifests as a localized pinhole or puncture site (herein, "the failure site") extending through the thickness of the varistor. This failure site creates a path for current flow between the two electrodes of a low resistance, but high enough to generate ohmic losses and cause overheating of the device even at low fault currents. Sufficiently large fault current through the varistor can melt the varistor in the region of the failure site and generate an electric arc.

A varistor failure as a linear resistance will cause the conduction of a limited current through the varistor that will result in a buildup of heat. This heat buildup may result in catastrophic thermal runaway and the device temperature may exceed a prescribed maximum temperature. For example, the maximum allowable temperature for the exterior surfaces of the device may be set by code or standard to prevent combustion of adjacent components. If the leakage current is not interrupted at a certain period of time, the overheating will result eventually in the failure of the varistor to a short circuit as defined above.

In some cases, the current through the failed varistor could also be limited by the power system itself (e.g., ground resistance in the system or in photo-voltaic (PV) power source applications where the fault current depends on the power generation capability of the system at the time of the failure) resulting in a progressive build up of temperature, even if the varistor failure is a short circuit. There are cases where there is a limited leakage current flow through the varistor due to extended in time overvoltage conditions due to power system failures, for example. In addition, a varistor will exhibit some leakage current at voltages below the threshold at which the varistor becomes substantially conductive. These conditions may lead to temperature build up in the device, such as when the varistor has failed as a linear resistance and could possibly lead to the failure of the varistor either as a linear resistance or as a short circuit as described above.

As discussed above, in some cases the module 100 may assume an "end of life" mode in which the varistor 132 is depleted in full or in part (i.e., in an "end of life" state), leading to an end of life failure. When the varistor reaches its end of life, the module 100 will become substantially a short circuit with a very low but non-zero ohmic resistance. As a result, in an end of life condition, a fault current will continuously flow through the varistor even in the absence of an overvoltage condition.

The SPD assembly 101 has several modes of operation depending on the state of the varistor 132 and external event conditions.

In some modes, the first fail-safe mechanism 102 operates by heating the solder 159 until the solder melts and permits the elastic spring loads of the spring 150 to cause the contact portion 154B to pull away from the terminal tab 137 and thereby out of electrical continuity with the electrode 136. The varistor 132 is thereby electrically disconnected from the contact member 168, creating an open circuit between the terminals 166B, 168B.

In some modes, the second fail-safe mechanism 104 operates by heating the spring 150 at the weak region 156 until the weak region is sufficiently heat-softened to permit the loads of the spring 150 to cause the spring 150 to break at the weak region 156. The contact portion 154B may remain bonded to the terminal tab 137 by the solder 159, but the lower portion 154A pulls away from contact portion 154B and thereby out of electrical continuity with the electrode 136. The varistor 132 is thereby electrically disconnected from the contact member 168, creating an open circuit between the terminals 166B, 168B.

During normal operation (referred to herein as Mode 1), the module 100 operates as an open circuit between the line cable CL and the PE cable CP. The thermal disconnector mechanism 151 remains in a ready position (FIG. 11), with the contact portion 154B of the disconnect spring 150 bonded to and in electrical continuity with the terminal tab 137 by the solder 159. In this normal mode, the varistor 132 is an insulator up to the nominal clamping voltage VNOM (and therefore the SPD module 100 is an insulator as well). In this mode, the fail-safe mechanisms 102, 104 are not actuated (i.e., the thermal disconnector 151 remains in the ready position (FIG. 11)).

In the event of a transient overvoltage or surge current in, the line L1, protection of power system load devices may necessitate providing a current path to ground for the excess current of the surge current. The surge current may generate a transient overvoltage between the line cable CL and the PE cable CP, which may overcome the isolation of the varistor 132 and one or both of the GDTs 140. In this event and mode (referred to herein as Mode 2), the varistor 132 is subjected to an overvoltage exceeding VNOM, and temporarily and reversibly becomes a low resistance electrical conductor. Similarly, the GDT 140 is subjected to a transient overvoltage exceeding its break down voltage, and temporarily and reversibly becomes a low resistance electrical conductor. The GDT 140 and varistor 132 will then divert, shunt or allow the high surge current or impulse current to flow from the line cable CL, through the base connector 84, through the contact member 168, through the spring 150, through the solder 159, through the terminal tab 137, through the electrode 136, through the varistor 132, through the electrode 134, through the GDTs 140, through the GDT electrode 142, through the contact member 166, and through the base connector 86 and to the protective earth cable CP for a short duration.

In Mode 2, the fail-safe mechanism 102 does not operate because the overvoltage event is short in duration and the heat generated by the surge current is insufficient to melt the solder 159.

In Mode 2, the fail-safe mechanism 104 does not operate because the heat generated in the spring 150 is not sufficient to weaken the weak region 156 to the point of breaking.

If the surge or impulse current is below the maximum surge/impulse current that the SPD module 100 is rated for, the external fuse FS will not blow and the varistor 132 should remain functional. In this case, because the fail-safe mechanisms 102, 104 are not tripped, the SPD module 100 can remain in place for future overvoltage events.

If the surge or impulse current exceeds the maximum surge/impulse current that the SPD module 100 is rated for, the fuse FS will typically blow or be tripped. The varistor 132 may also fail internally as a short (with pinhole) or with limited resistance. In such cases, the mode of operations will be a failure mode as described below for Modes 3, 4 or 5.

In a third mode (Mode 3), the varistor 132 is in end of life mode with a low leakage current between the lines L1 and PE. The varistor 132 fails as a linear resistance. This type of varistor failure could be the result of multiple surge/impulse currents. The leakage current generates heat in the varistor 132 from ohmic losses. In some cases, the leakage current occurs during normal operation and is low (from about 0 to 0.5 A). The heat generated in the varistor 132 progressively deteriorates the varistor 132 and builds up over an extended duration.

In Mode 3, the fail-safe mechanism 102 operates. More particularly, the heat (e.g., from ohmic losses in the varistor 132) is transferred from the varistor 132 to the electrode 136, and then to the solder 159. Over an extended time period (e.g., in the range of from about 60 seconds to 48 hours), the heat builds up in the solder 159 until the solder 159 melts. The melted solder 159 releases the spring 150 into an open or released configuration to open the circuit in the SPD module 100. The varistor 132 is thereby prevented from catastrophically overheating.

In Mode 3, the fail-safe mechanism 104 does not operate because the heat generated in the spring 150 is not sufficient to weaken the weak region 156 to the point of breaking.

In Mode 3, the SPD module 100 must be replaced because the fail-safe mechanism 102 has been tripped.

In a fourth mode (Mode 4), the varistor 132 is in good condition (i.e., not in end of life condition), but there is a Temporary Overvoltage (TOV) event wherein the voltage across the terminals 166B, 168B forces the varistor 132 to conduct an increased surge current (typically, in the range of from about 0 to 10 A). This current builds up heat over a duration (e.g., in the range of from about 5 seconds to 120 minutes) that is shorter than the duration of the surge current that triggers the fail-safe mechanism 102 in Mode 3, but far longer than the impulse current that is conducted by the varistor 132 in Mode 2.

In Mode 4, the fail-safe mechanism 102 is tripped (i.e., the spring 150 is released by the solder 159) to open the circuit through the SPD module 100 in the same manner as described for Mode 3.

In Mode 4, the fail-safe mechanism 104 does not operate because the heat generated in the spring 150 is not sufficient to weaken the weak region 156 to the point of breaking.

In Mode 4, the SPD module 100 must be replaced because the fail-safe mechanism 102 has been tripped.

In a fifth mode (Mode 5), the varistor 132 is in end of life mode as a short circuit or a linear resistance that allows current from the power source to be conducted therethrough. The value of the conducted current could be between about 10 Amps and the maximum short circuit current of the power source (which should be lower than the short circuit current rating of the SPD module 100). This depends on the specific configuration of the electrical installation and the severity of the varistor failure.

For Mode 5, there are two mechanisms operating to protect the SPD module 100: namely, the external fuse FS and the fail-safe mechanism 104 as described above. The fail-safe mechanism 104 is triggered for current levels between 10 Amps and intermediate current levels (typically five times the rating of the external fuse FS). For higher current levels, the external fuse FS will trip first to protect the SPD 100. For example, an SPD 100 could be protected by the fail-safe mechanism 104 for current levels up to 1000 A and with a 200 A external fuse FS for current levels up to 25 kA.

In Mode 5, for intermediate currents, the current level is not high enough to trip the external fuse FS within a reasonable amount of time (e.g., in the range of from about 50 ms to 5000 ms). Further, the fail-safe mechanism 102 is too slow and cannot protect the SPD module 100. By the time the fail-safe mechanism 102 trips, there would be significant internal damage to the SPD module 100.

Therefore, in Mode 5, the fail-safe mechanism 104 is tripped to open the circuit through the SPD module 100. More particularly, the current heats the spring 150 at the weak region 156 until the loads of the spring 150 cause the spring 150 to break at the weak region 156 and produce the necessary distance between the electrodes for extinguishing the associated arc. The varistor 132 is thereby electrically disconnected from the contact member 168, creating an open circuit between the terminals 166B, 168B. Only the fail-safe mechanism 104 operates in time and disconnects the SPD 100 before any internal damage takes place.

Alternatively, a lower rated fuse FS could be used so that the fuse FS will trip much faster and protect the SPD 100 even at intermediate current levels. For example, a 10 A fuse FS could be used and the fail-safe mechanism 104 could be omitted. But then, such a lower rated fuse FS would trip at surge/impulse currents below the level that the SPD 100 could actually withstand. Therefore, by using the fail-safe mechanism 104, the performance of the SPD 100 is extended in surge/impulse currents.

The release of the disconnect spring 150 as described above (by actuation of the fail-safe mechanism 102 or the fail-safe mechanism 104) also actuates a local alert mechanism 107. The displacement of the spring 150 in the release direction DR frees the swing arm 172 from the spring 150. The swing arm 172 is driven in a pivot direction DP (FIG. 11) by the spring 176 from the locked position (FIG. 11) to an indicating position. The indicator member 174 is thereby driven by the spring 176 to slide along the front wall in a signaling direction DS (FIG. 11). The indicator member 174 is thereby displaced to an alert position as shown in wherein the indicator surface 174A is aligned with and visible through the front window 112B of the module housing 110. The indicator surface 174A has a noticeably different visual appearance through the front window 112B than the housing indicator surface 116C, providing a visual alert or indication so that an operator can readily determine that the local alert mechanism 107 has been activated. For example, the housing indicator surface 116C and the indicator surface 174A may have distinctly different colors (e.g., green versus red). In this manner, the local alert mechanism 107 can provide a convenient indication that the module 100 has assumed its open circuit configuration or state.

The release of the swing arm 172 as described above also actuates a remote alert mechanism 108. In the ready position of the module 100, an end of the switch arm 172 covers a rear opening of the frame so that the switch pin 88A of the base 80 is maintained compressed. The swing arm 172 pivots away from the rear opening so that the switch pin 88A is thereby permitted to extend further into the module 100 to an alert signal position. The remote pin 88A is connected to the switch electronics or sensor, which detects the displacement of the pin 88A and provides an electrical signal to a remote device or terminal via the connector. In this manner, the remote alert mechanism 108 can provide a convenient remote indication that the module 100 has assumed its open circuit configuration or state.

As discussed above, the thermal disconnector mechanism 151 is responsive to temperature rise in the SPD module 100 when current flows through the varistor 132, and disconnects the varistor 132 from the power line. In general, the thermal disconnector mechanism 151 may be configured to desirably balance the response of the SPD assembly 100 and the fuse FS to impulse or surge currents versus leakage currents. The failure mode of the varistor 132 could be one of the modes discussed above, for example: progressive deterioration of the varistor 132 that will result in increased leakage current at normal operation (e.g., 0-0.5 A); temporary overvoltage (TOV) events that will result in an increased conduction of leakage current (e.g., 0.5 A-10 A); or a short circuit of the varistor 132 that may result in a significant current conduction (a few amps up to the full prospective short circuit current of the power line, e.g., up to 200 kArms).

When the varistor 132 has an extended leakage or surge current conduction (Modes 3 and 4 discussed above), then the varistor 132 will progressively overheat over an extended period of time. Eventually, the thermal disconnector mechanism 151 will then react to the temperature rise of the varistor 132 that is transferred to the solder joint through the electrode tab 137. How fast the thermal disconnector mechanism 151 will react to this event on a given temperature profile of the varistor 132 depends on the materials of the components of the thermal disconnector mechanism 151 and the melting point of the solder 159. These parameters can be selected to tune the response of the thermal disconnector mechanism 151 to different event profiles or types of events.

Further, the reaction time of the thermal disconnector mechanism 151 should not be too fast, because in cases where the varistor 132 conducts surge currents of increased energy, the varistor 132 will overheat and the disconnector mechanism 151 might trip, even though the varistor 132 is intact. Therefore, it is desirable or necessary to fine tune the reaction time of the thermal disconnector mechanism 151. Therefore, the selection of the material and shape of the elements that constitute the thermal disconnector mechanism 151 are important, and may be critical, for proper operation during all kinds of events/exposures the SPD module 100 might face, as the reaction time depends on this selection.

During sudden failure of the varistor 132 to a short circuit, the current through the varistor 132 could reach from intermediate values (a few kA) up to the maximum short circuit current of the power line. For intermediate values of current, typically the weak point 156 of the thermal disconnector will overheat first, melt and disconnect the current via the second fail-safe mechanism 104. This is done because the weak point 156 of the thermal disconnector mechanism 151 has a decreased cross section area of higher resistance. Also the selection of the material of the weak region 156 is important for its fast reaction time, as in such events the second fail-safe mechanism 104 of the thermal disconnector mechanism 151 must react very fast. The second fail-safe mechanism 104 is not responsive to surge currents, so there is no low limit for its response time. In addition, if the second fail-safe mechanism 104 does not react fast enough, the SPD module 100 may be damaged due to the high current conducted. Further, during these events there will be no melting of the solder 159, as the first fail-safe mechanism 102 takes a relatively long time to react (seconds), while the second fail-safe mechanism 104 executes more quickly and the weak point 156 will melt in milliseconds (ms).

When the short circuit current is high enough, then the SPD module 100 is protected by an external fuse FS. In general, the external fuse FS will trip when the short circuit current is sufficient to trip when the fuse FS. The thermal disconnector mechanism 151 (either the first fail-safe mechanism 102 or the second fail-safe mechanism 104) will trip when the short circuit current is insufficient to trip the fuse FS.

The provision of the GDTs 140 in series with the varistor 132 can provide a substantially leakage-free operation. In the absence of a surge current, the GDTs 140 will remain non-electrically conducting, and will thereby prevent conduction of a leakage current through the varistor 132. In the event of a surge, the varistor 132 will clamp and conduct, permitting the GDTs 140 to break over and conduct. When the surge subsides, the varistor 132 will return to their high electrical insulating states, causing the arcs of the GDTs 140 to extinguish. In this manner, the varistor 132 can terminate an extended follow current that may otherwise cause the GDTs 140 to fail.

The potting P can provide strength and vibration resistance to the SPD module 100 and may be less expensive to use than epoxy. The potting P can provide thermal absorption to cool the varistor 132 and the GDTs 140.

In some embodiments, the module 100 is a Class I surge protective device (SPD). In some embodiments, the module 100 is compliant with IEC 61643-11 "Additional duty test for test Class I" for SPDs (Clause 8.3.4.4) based on the impulse discharge current waveform defined in Clause 8.1.1 of IEC 61643-11, typically referred to as 10/350 microsecond ("µs") current waveform ("10/350 µs current waveform"). The 10/350 µs current waveform may characterize a current wave in which the maximum current (100%) is reached at about 10 µs and the current is 50% of the maximum at about 350 µs. Under 10/350 µs current waveform, the transferred charge, Q, and specific energy, W/R, to SPDs should be related with peak current according to one or more standards. For example, the IEC 61643-11 parameters to Class I SPD test are illustrated in Table 1, which follows:

TABLE 1

| Parameters for Class I SPD Test | | |
|---|---|---|
| $I_{imp}$ within 50 µs (kA) | Q within 5 ms (As) | W/R within 5 ms (kJ/Ω) |
| 25 | 12.5 | 156 |
| 20 | 10 | 100 |
| 12.5 | 6.25 | 39 |
| 10 | 5 | 25 |
| 5 | 2.5 | 6.25 |
| 2 | 1 | 1 |
| 1 | 0.5 | 0.25 |

It is desirable that the SPD modules have a small form factor. In particular, in some applications it is desirable that the SPD modules each have a size of 1 TE according to DIN Standard 43871, published Nov. 1, 1992. According to some embodiments, the module 100 has a maximum width W9 (FIG. 6) parallel to the axis F1-F1 of about 18 mm.

Figure 14:
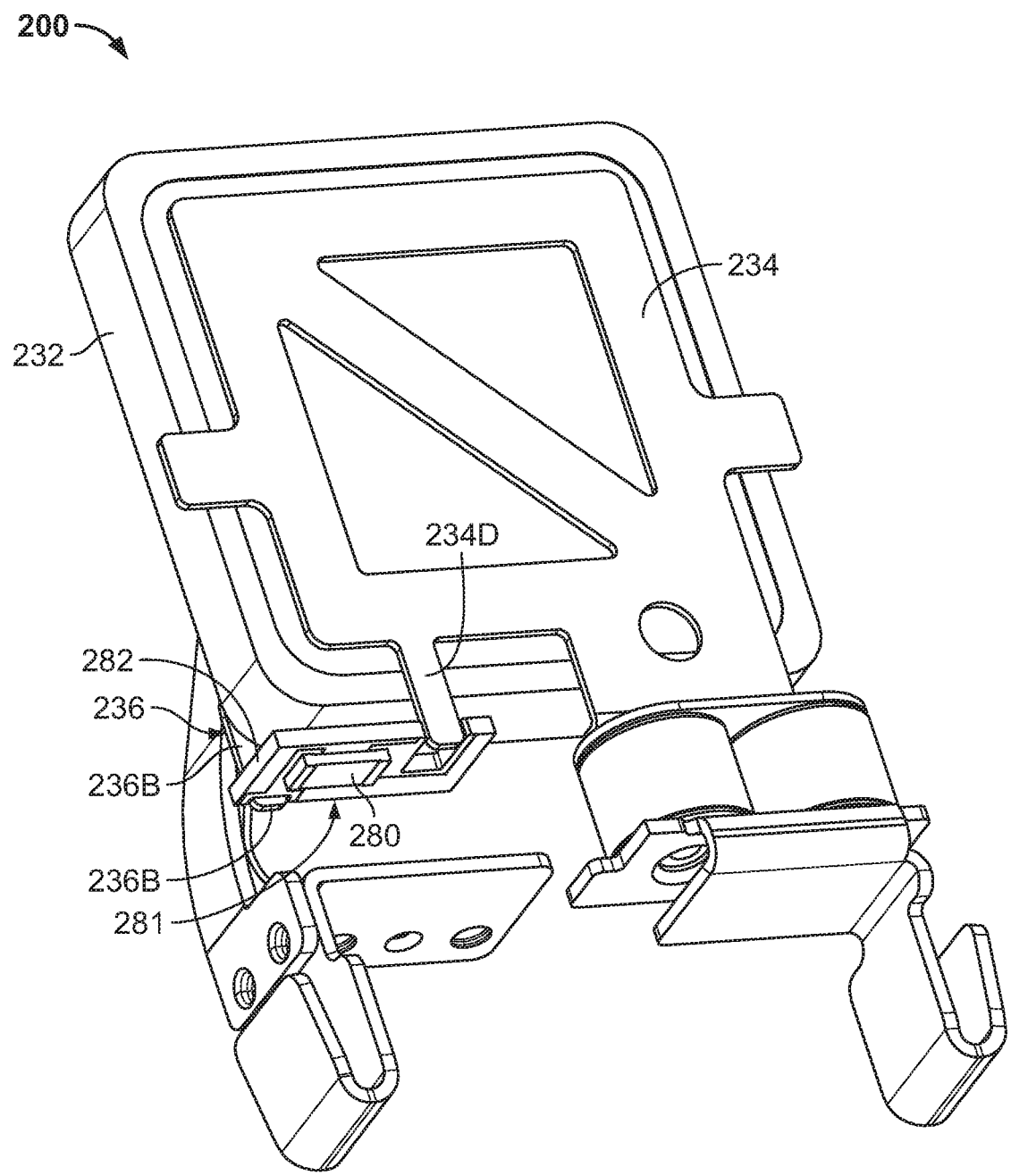
FIG. 14 is a fragmentary, rear perspective view of an SPD module for use in the SPD assembly of FIG. 6 in accordance with further embodiments of the inventive concept and with a cover thereof removed.
Figure 15:
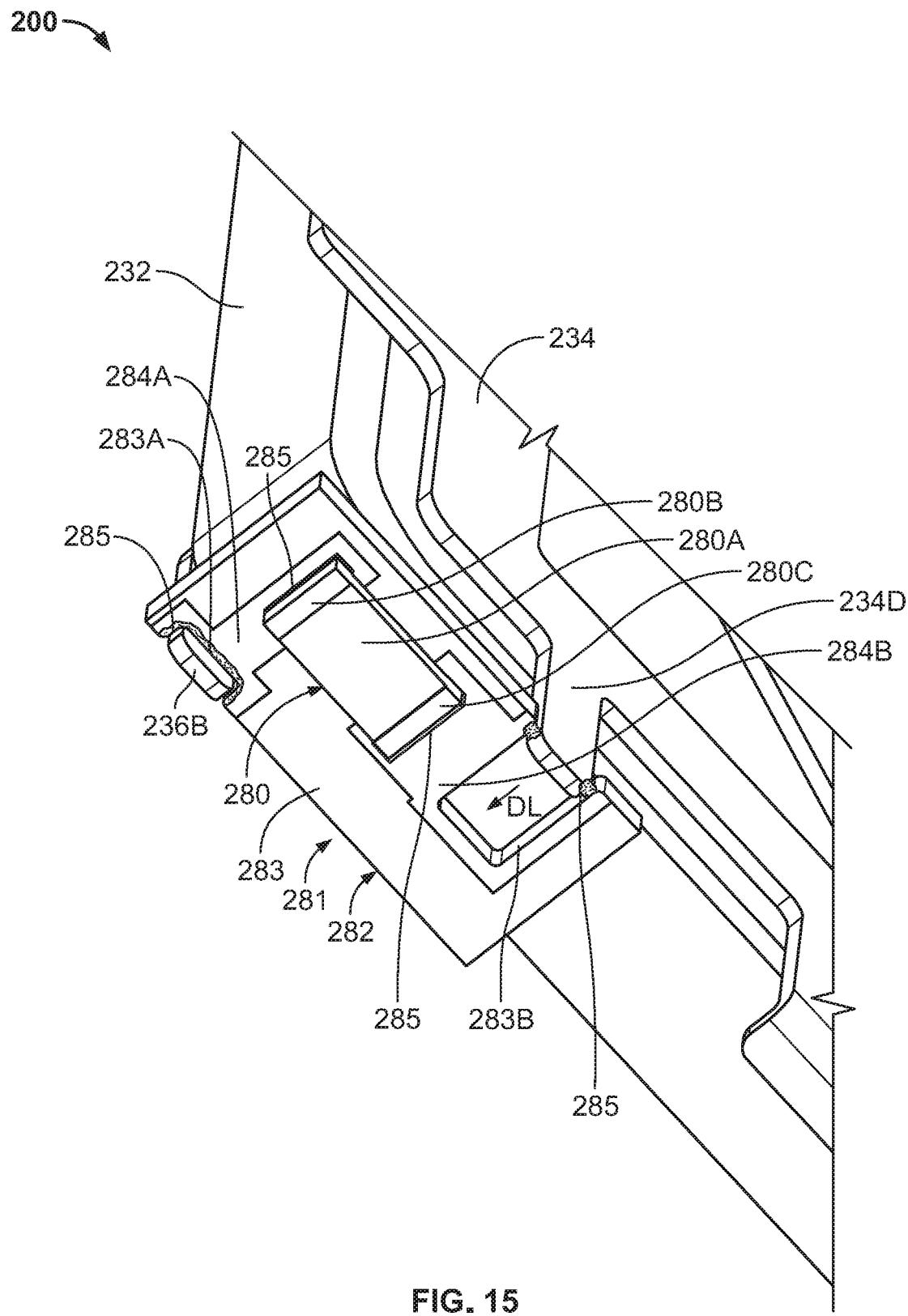
FIG. 15 is an enlarged, fragmentary, rear perspective view of the SPD module of FIG. 14.

With reference to FIGS. 14 and 15, a modular overvoltage protection device or surge protective device (SPD) module to further embodiments of the present invention is shown therein and designated 200. For the purpose of explanation, only certain internal components of the module 200 are shown in FIGS. 14 and 15. The module 200 is constructed, used and operates in the same manner as the module 100, except as follows.

The SPD module 200 includes the overvoltage protection circuit 600 of FIG. 1.

The disconnect electrode 236 includes an integral contact tab 236B.

The module 200 includes a PCB resistor assembly 281 in place of the resistor 180. The PCB resistor assembly 281 includes a resistor 280, a printed circuit board (PCB) 282, and solder 285.

The PCB 282 includes an electrically nonconducting substrate 283 having conductive layers 284A, 284B thereon. The conductive layers 284A, 284B may be copper foil tracks deposited or laminated onto an outer surface of substrate 283. The substrate 283 may be formed of any suitable material such as glass epoxy, for example. A relatively shallow slot 283A is defined in one side edge of the substrate 283. A relatively deeper slot 283B is defined in the opposite side edge of the substrate 283.

The resistor 280 may be a surface mount device (SMD) resistor. Suitable SMD resistors include the thick film high voltage chip resistor Type CHV2512-FX-1004ELF rated at 1 MΩ available from Bourns Inc. of USA. The resistor 280 includes a resistor body 280A and opposed electrical terminals 280B, 280C. The resistor 280 is mechanically affixed to the PCB 282 such that the terminals 280B and 280C are electrically connected to the conductive layers 284A and 284B, respectively. In some embodiments, the terminals 280B and 280C are affixed and electrically connected to the conductive layers 284A and 284B by solder 285.

The contact tab 234D of the ground electrode 234 is seated in the slot 283D. The contact tab 236B of the disconnect electrode 236 is seated in the slot 283A. The contact tab 236B is mechanically secured and electrically connected to the conductive layer 284A by solder 285. The contact tab 234D is mechanically secured and electrically connected to the conductive layer 284B by solder 285. In this manner, the terminal 280B is electrically connected to the electrode 236 and the terminal 280C is electrically connected to the electrode 234.

The slot 283B enables the components of the module 200 to be conveniently configured for varistors 232 of different thicknesses. Different thickness varistors may be used for different voltage protection levels. Varistors of different thickness require different spacings between the electrodes 234, 236 and gaps between the tabs 234D, 236B. During manufacture, this variability can be accommodated by sliding the tab 234D into the slot 283B in lateral direction DL as needed, and then securing and electrically connecting the tab 234D to the copper layer 284B using solder 285.

Figure 16:
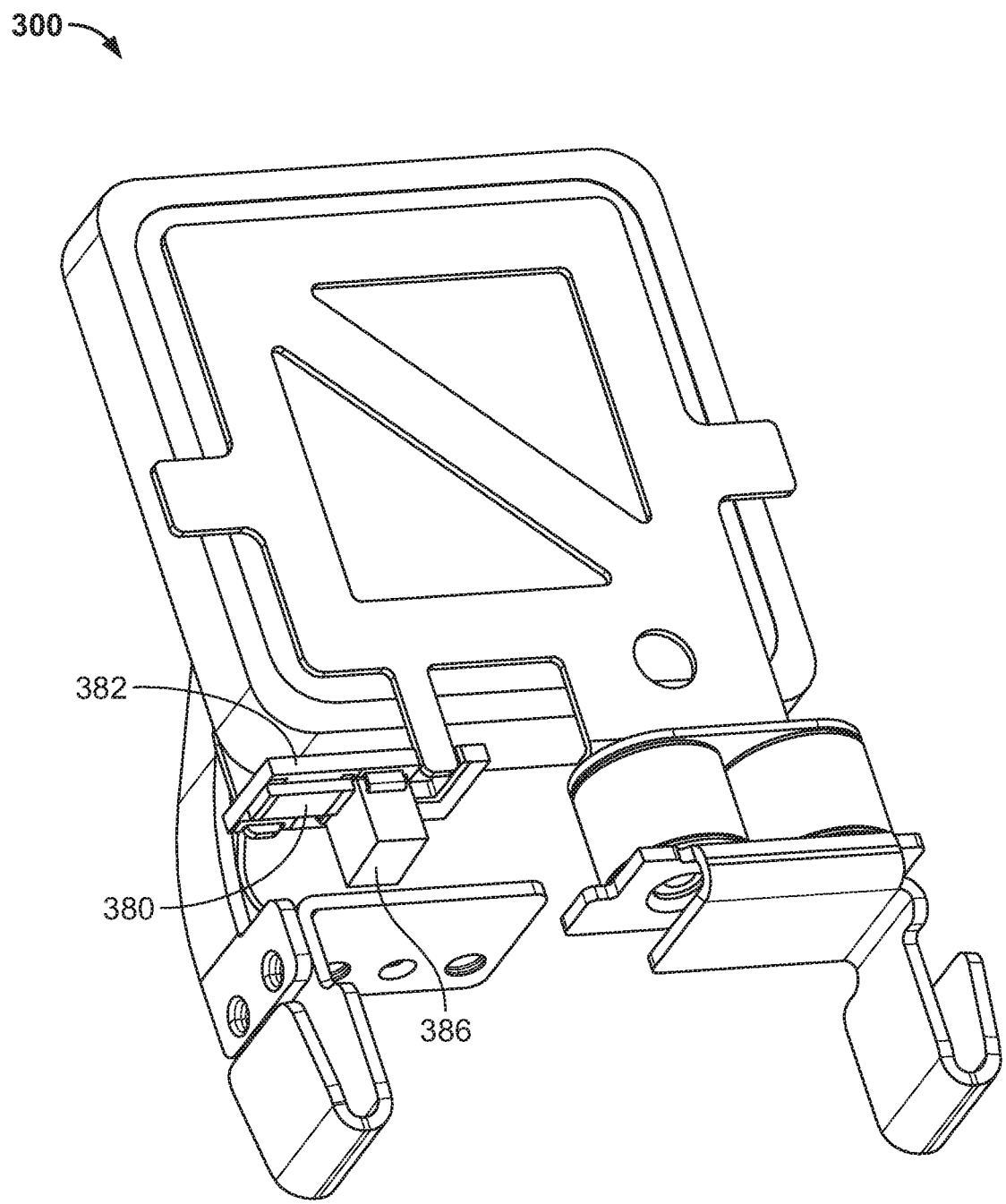
FIG. 16 is a fragmentary, perspective view of an SPD module for use in the SPD assembly of FIG. 6 in accordance with further embodiments of the inventive concept and with a cover thereof removed.

With reference to FIG. 16, a modular overvoltage protection device or surge protective device (SPD) module according to further embodiments of the present invention is shown therein and designated 300. For the purpose of explanation, only certain internal components of the module 300 are shown in FIG. 16. The module 300 is constructed, used and operates in the same manner as the module 200, except as follows.

The module 300 may include the overvoltage protection circuit 700 of FIG. 2 according to some embodiments of the inventive concept. The module 300 includes an inductor 386 mounted on the PCB 382 in electrical series with the resistor 380. The inductor 386 corresponds to the inductor L1 of the overvoltage protection circuit 700 of FIG. 2.

The inductor 386 may be a surface mount device (SMD) inductor coil. Suitable SMD inductor coils include the Wirewound Chip Inductor CC453232 Series Type 331KL available from Bourns Inc. of USA. The terminals of the inductor 386 may be affixed and electrically connected to the conductive layers of the PCB 382 by solder.

With reference to FIGS. 17-20, a modular surge protective device (SPD) or overvoltage protection device according to further embodiments of the present invention is shown therein and designated 400. In accordance with some embodiments, the overvoltage protection device 400 is used as an SPD in an electrical circuit as discussed above. For example, overvoltage protection devices 400 may be used in place of one or more of the SPDs S1, S2, S3 in the system 15 of FIG. 5.

The overvoltage protection device 400 includes the overvoltage protection circuit 600 of FIG. 1. Alternatively, the device 400 may be modified to include an inductor corresponding to the inductor L1 of FIG. 2, in which case the modified device 400 will include the overvoltage protection circuit 700 of FIG. 2.

Figure 17:
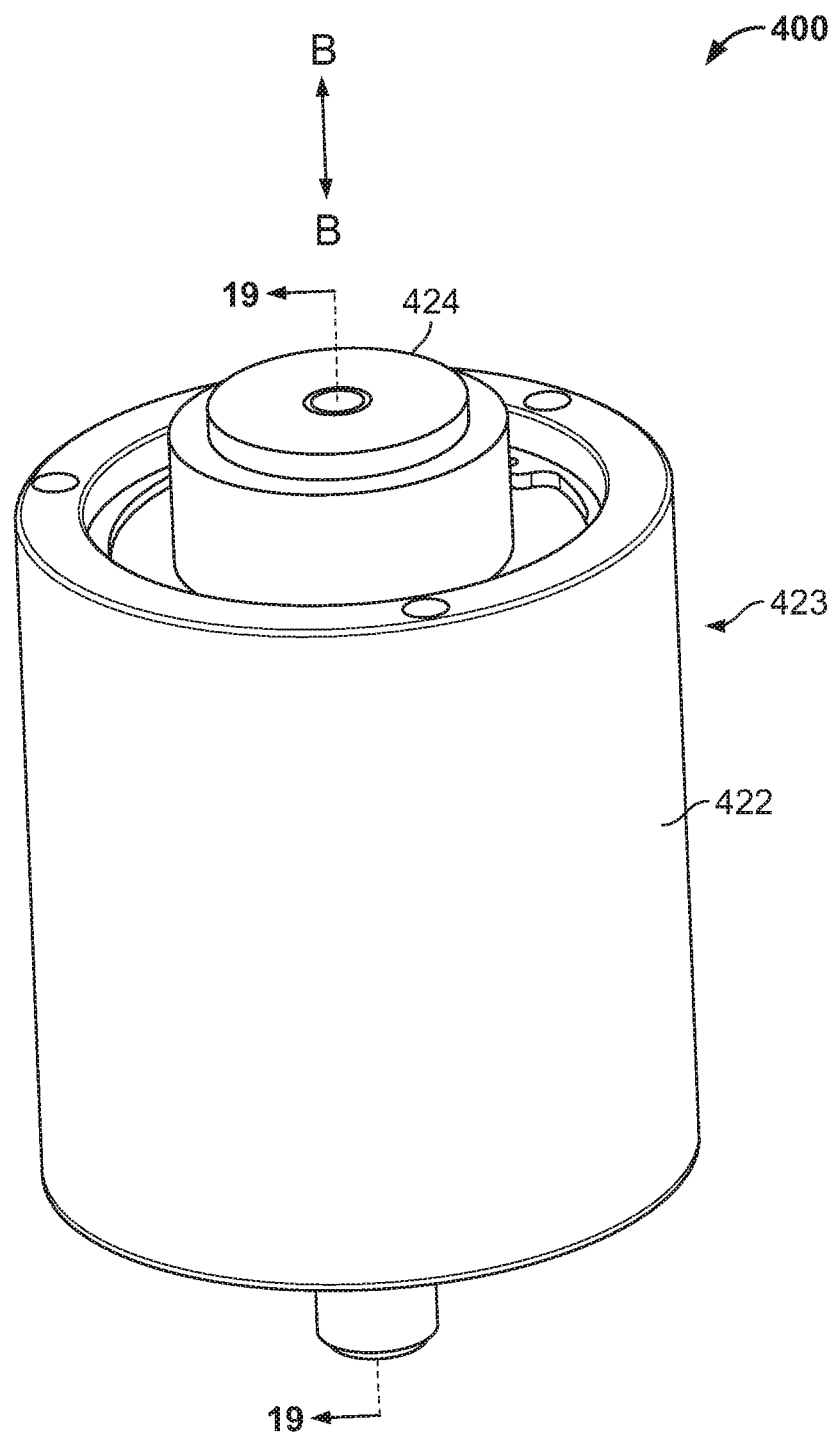
FIG. 17 is a perspective view of an SPD module for use in the electrical circuit of FIG. 5 in accordance with further embodiments of the inventive concept.

The overvoltage protection device 400 is configured as a unit or module having a lengthwise axis B-B (FIG. 17). The overvoltage protection device 400 includes a first electrode or housing 422, a piston-shaped second electrode 424, two spring washers 428E, a flat washer 428D, an insulating ring member 428C, two O-rings 430A, 430B, an end cap 428A, a retention clip 428B, a meltable member 432, a varistor 452, a GDT 440, a first internal electrode 460, a second internal electrode 462, a resistor 480, electrical insulation 486, and a GDT contact member 442. The varistor 452, the internal electrodes 460, 462, the resistor 480, and the insulation 486 form an overvoltage clamping element subassembly 450.

The overvoltage protection device 400 may further include an integral fail-safe mechanism, arrangement, feature or system 402. The fail-safe system 402 is adapted to prevent or inhibit overheating or thermal runaway of the overvoltage protection device, as discussed in more detail below.

The components 422, 424, 428A-C collectively form a housing assembly 423 defining a sealed, enclosed chamber 426. The components 428A-E, 432, 460, 452, 462, 442, 440, 480 and 486 are disposed axially between the housing 422 and the electrode 424 along the lengthwise axis B-B, in the enclosed chamber 426.

The housing 422 has an end electrode wall 422A and an integral cylindrical sidewall 422B extending from the electrode wall 422A. The sidewall 422B and the electrode wall 422A form a chamber or cavity 422C communicating with an opening 422D. A threaded post 422E projects axially outwardly from the electrode wall 422A. The inner side of the electrode wall 422A includes a circular recess 422F configured to receive a terminal 440B of the GDT 440.

The electrode wall 422A has an inwardly facing, substantially planar contact surface 422G. An annular clip slot 422H is formed in the inner surface of the sidewall 422B. According to some embodiments, the housing 422 is formed of aluminum. However, any suitable electrically conductive metal may be used. According to some embodiments, the housing 422 is unitary and, in some embodiments, monolithic. The housing 422 as illustrated is cylindrically shaped, but may be shaped differently.

The inner electrode 424 has a head 424A disposed in the cavity 422C and an integral shaft 424B that projects outwardly through the opening 422D.

The head 424A has a substantially planar contact surface 424C that faces the contact surface 422G of the electrode wall 422A. A pair of integral, annular, axially spaced apart flanges 424D extend radially outwardly from the shaft 424B and define an annular, sidewardly opening groove 424E therebetween. A threaded bore is formed in the end of the shaft 424B to receive a bolt for securing the electrode 424 to a busbar, for example.

According to some embodiments, the electrode 424 is formed of aluminum. However, any suitable electrically conductive metal may be used. According to some embodiments, the electrode 424 is unitary and, in some embodiments, monolithic.

An annular gap is defined radially between the head 424A and the nearest adjacent surface of the sidewall 422B. According to some embodiments, the gap has a radial width in the range of from about 4 to 45 mm.

The meltable member 432 is annular and is mounted on the electrode 424 in the groove 424E. The meltable member 432 is spaced apart from the sidewall 422B a distance sufficient to electrically isolate the meltable member 432 from the sidewall 422B.

The meltable member 432 is formed of a heat-meltable, electrically conductive material. According to some embodiments, the meltable member 432 is formed of metal. According to some embodiments, the meltable member 432 is formed of an electrically conductive metal alloy. According to some embodiments, the meltable member 432 is formed of a metal alloy from the group consisting of aluminum alloy, zinc alloy, and/or tin alloy. However, any suitable electrically conductive metal may be used.

According to some embodiments, the meltable member 432 is selected such that its melting point is greater than a prescribed maximum standard operating temperature. The maximum standard operating temperature may be the greatest temperature expected in the meltable member 432 during normal operation (including handling overvoltage surges within the designed for range of the system) but not during operation which, if left unchecked, would result in thermal runaway. According to some embodiments, the meltable member 432 is formed of a material having a melting point in the range of from about 80 to 460° C. and, according to some embodiments, in the range of from about 110 to 160° C. According to some embodiments, the melting point of the meltable member 432 is at least 20° C. less than the melting points of the housing 422 and the electrode 424 and, according to some embodiments, at least 40° C. less than the melting points of those components.

According to some embodiments, the meltable member 432 has an electrical conductivity in the range of from about $0.5 \times 40^6$ Siemens/meter (S/m) to $4 \times 40^7$ S/m and, according to some embodiments, in the range of from about $4 \times 40^6$ S/m to $3 \times 40^6$ S/m.

The varistor wafer 452 and the two internal electrodes 460, 462 are axially stacked in the chamber 426 between the electrode head 424 and the electrode wall 422. The internal electrodes 460, 462 electrically interconnect the wafer 452, the resistor 480, and the electrodes 422, 424 in the manner represented in the schematic electrical diagram of FIG. 1. The varistor wafer 452, the internal electrodes 460, 462, the resistor 480, and the insulation 486 form the subassembly 450.

According to some embodiments, the varistor 452 is a varistor wafer (i.e., is wafer- or disk-shaped). In some embodiments, the varistor wafer 452 is circular in shape and has a substantially uniform thickness. However, varistor wafer 452 may be formed in other shapes. The thickness and the diameter of the varistor wafer 452 will depend on the varistor characteristics desired for the particular application. Moreover, the varistor wafer 452 may be replaced with an axially stacked plurality of varistor wafers.

In some embodiments, the varistor wafer 452 has a diameter D4 to thickness T4 ratio of at least 3. In some embodiments, the thickness T4 (FIG. 19) of the varistor wafer 452 is in the range of from about 0.5 to 15 mm. In some embodiments, the diameter D4 (FIG. 19) of the varistor wafer 452 is in the range of from about 20 to 100 mm.

The varistor wafer 452 has first and second opposed, substantially planar contact surfaces 452U, 452L and a peripheral edge 452E.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

The varistor wafer 452 may include a wafer of varistor material coated on either side with a conductive coating so that the exposed surfaces of the coatings serve as the contact surfaces 452U, 452L. The coatings can be metallization formed of aluminum, copper or silver, for example. Alternatively, the bare surfaces of the varistor material may serve as the contact surfaces 452U, 452L.

The internal electrodes 460, 462 are electrically conductive. Each internal electrode 460, 462 includes a contact portion 460A and an integral connection tab 460B extending radially outwardly from the peripheral edge of the contact portion 460A. Each tab 460A may include a hole 460C (e.g., a through hole).

According to some embodiments, each contact portion 460A is substantially planar, relatively thin and wafer- or disk-shaped. In some embodiments, each contact portion 460A has a diameter to thickness ratio of at least 15. In some embodiments, the thickness of each contact portion 460A is in the range of from about 0.1 to 3 mm. In some embodiments, the diameter of each contact portion 460A is in the range of from about 20 to 100 mm.

According to some embodiments, each contact portion 460A does not have any through holes extending through the thickness of the contact portion.

According to some embodiments, the internal electrodes 460, 462 are formed of copper. However, any suitable electrically conductive metal may be used. According to some embodiments, the internal electrodes 460, 462 are unitary and, in some embodiments, monolithic.

Figure 19:
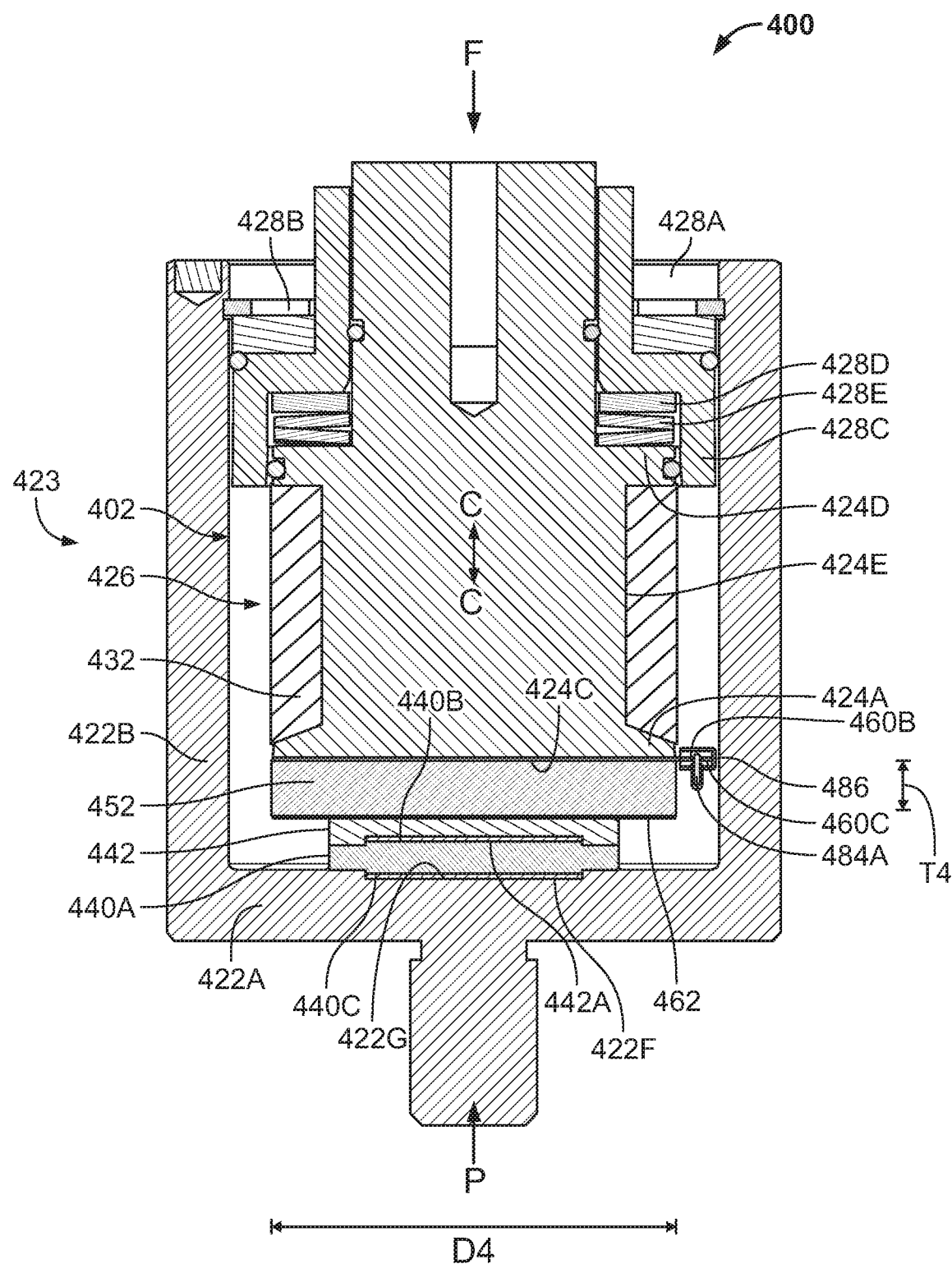
FIG. 19 is a cross-sectional view of the SPD module of FIG. 17 taken along the line 19-19 of FIG. 17.

The varistor wafer 452 is interposed or sandwiched between the internal electrodes 460, 462 as shown in FIG. 19. The contact portion 460A of the internal electrode 460 engages the contact surface 452U. The contact portion 460A of the internal electrode 462 engages the contact surface 452L. Each said engagement forms an intimate physical or mechanical contact between the identified internal electrode contact portion and varistor contact surface. Each said engagement forms a direct electrical connection or coupling between the identified interconnect member contact portion and varistor contact surface.

In some embodiments, each internal electrode contact portion 460A covers and engages at least 40% of the surface area of the corresponding mating varistor wafer surface 452U, 452L.

Figure 18:
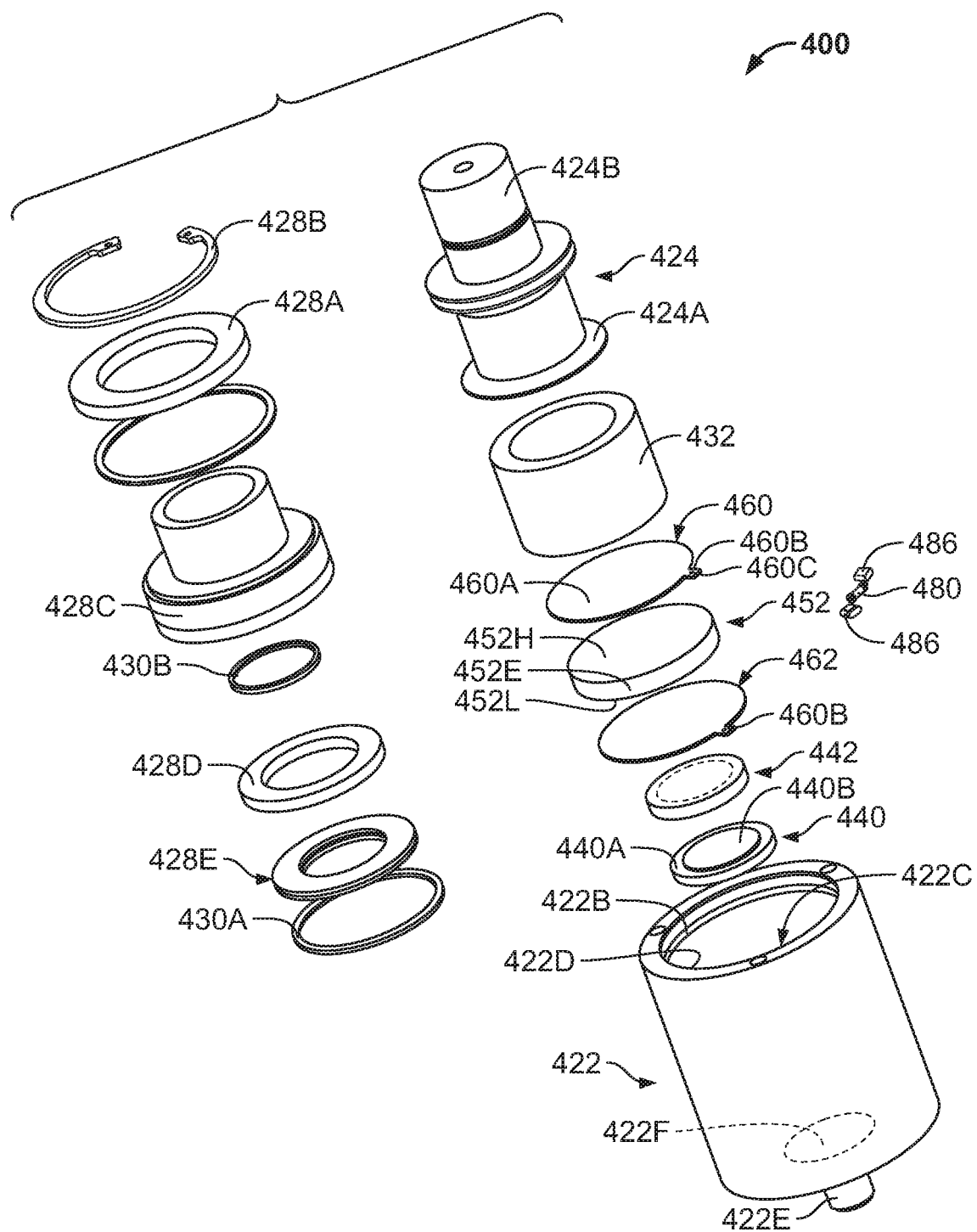
FIG. 18 is an exploded, perspective view of the SPD module of FIG. 17.

The resistor 480 corresponds to the resistor R1 of FIG. 1. The resistor 480 may be a through hole resistor including a resistor body 482 and opposed leads 484A, 484B. The resistor 480 may be an axial lead resistor as shown in FIG. 18 or of another configuration (e.g., a radial lead resistor).

The resistor lead 484A is mechanically and electrically connected to the tab 460B of the electrode 460. The resistor lead 484B is mechanically and electrically connected to the tab 460B of the electrode 462. In some embodiments, the leads 484A and 484B are soldered to the tabs 460B. In some embodiments, the ends of the leads 484A, 484B are seated in the holes 460C in the tabs 460B and soldered in place.

Suitable through hole resistors for the resistor 480 may include the metal film resistor type HVR3700001004JR500 rated at 1 MΩ available from Vishay of USA.

The resistor leads 484A, 484B and the tabs 460B are covered by the electrical insulation 486. In some embodiments, the insulation 486 is an electrically insulating epoxy. In some embodiments, the insulation 486 is an electrically insulating heat shrunk thermoplastic. In some embodiments, the insulation 486 covers the entirety of each lead 484A, 484B from its tab 460A to the resistor body 482 and also covers the tabs 460A.

The GDT 440 is wafer or disk-shaped and includes a body 440A and opposed electrical terminals 440B and 440C on the major opposed faces of the body 440A, and an annular electrical insulator (e.g., ceramic) surrounding the body 440A between the terminals 440B, 440C. In some embodiments and as illustrated, the outer faces of the terminals 440B, 440C are substantially flat and planar or include a substantially flat or planar circular or annular contact region. According to some embodiments, the ratio of the diameter of the GDT 440 to its thickness is in the range of from about 4 to 15. According to some embodiments, the thickness of the GDT 440 is in the range of from about 3 mm to 8 mm. In some embodiments, the diameter of the GDT 440 is in the range of from about 20 mm to 40 mm. In some embodiments, the GDT 440 has surge current and energy withstand capabilities at least as great as those of the MOV varistor wafer 452 used in series with the GDT 440 in the same SPD 400. Suitable GDTs may include the Flat Gas Discharge Tube Type 3L30-25 rated at 600V GDT available from Varsi d.o.o. of Slovenia or D20-A800XP of TDK-EPC Corporation of Japan (EPCOS).

The body 440A includes a hermetically or gas-tight sealed chamber or cell in which a selected gas is contained. The terminals 440B, 440C are electrically connected to the gas (e.g., by respective electrode portions in fluid contact with the contained gas). Below a prescribed spark over the voltage, the GDT 440 is electrically insulating between the terminals 440B, 440C. When an applied voltage across the terminals 440B, 440C exceeds the prescribed spark over voltage, the contained gas is ionized to cause electrical current to flow through the gas (by the Townsend discharge process) and thereby between the terminals 440B, 440C. Thus, the GDT 440 will selectively electrically insulate or conduct, depending on the applied voltage. The voltage required to initiate and sustain electrical conduction (discharge) will depend on the design characteristics of the GDT 440 (e.g., geometry, gas pressure, and gas composition).

The GDT contact member 442 is a disk-shaped insert. The lower side of the member 442 includes a circular recess 442A configured to receive the terminal 440B of the GDT 440. The upper side of the member 442 is substantially planar to mate closely with the internal electrode 462. According to some embodiments, the GDT contact member 442 is formed of aluminum. However, any suitable electrically conductive metal may be used. According to some embodiments, the GDT contact member 442 is unitary and, in some embodiments, monolithic.

The spring washers 428E surround the shaft 424B. The lowermost spring washer 428E abuts the top face of the head 424A. The spring washers 428E may be formed of a resilient material. According to some embodiments and as illustrated, the spring washers 428E are wave washers (as shown) or Belleville washers formed of spring steel. While two spring washers 428E are shown, more or fewer may be used. The springs may be provided in a different stack arrangement such as in series, parallel, or series and parallel.

The flat metal washer 428D is interposed between the uppermost spring washer 428E and the insulator ring 428C with the shaft 424B extending through a hole formed in the washer 428D. The washer 428D serves to distribute the mechanical load of the upper spring washer 428E to prevent the spring washer 428E from cutting into the insulator ring 428C.

The insulator ring 428C overlies and abuts the washer 428D. The insulator ring 428C has a main body ring and a cylindrical upper flange or collar extending upwardly from the main body ring. The insulator ring 428C is preferably formed of a dielectric or electrically insulating material having high melting and combustion temperatures. The insulator ring 428C may be formed of polycarbonate, ceramic or a high temperature polymer, for example.

The end cap 428A overlies and abuts the insulator ring 428C. The end cap 428A may be formed of aluminum, for example.

The clip 428B is partly received in the slot 422H and partly extends radially inwardly from the inner wall of the housing 422 to limit outward axial displacement of the end cap 428A. The clip 428B may be formed of spring steel.

The O-ring 430B is positioned in a groove in the electrode 424 so that it is captured between the shaft 424B and the insulator ring 428C. The O-ring 430A is positioned in a groove in the insulator ring 428C such that it is captured between the insulating member 428C and the sidewall 422B. When installed, the O-rings 430A, 430B are compressed so that they are biased against and form a seal between the adjacent interfacing surfaces. In an overvoltage or failure event, byproducts such as hot gases and fragments from the varistor wafer 452 may fill or scatter into the cavity chamber 426. These byproducts may be constrained or prevented by the O-rings 430A, 430B from escaping the overvoltage protection device 400 through the housing opening 422D.

The O-rings 430A, 430B may be formed of the same or different materials. According to some embodiments, the O-rings 430A, 430B are formed of a resilient material, such as an elastomer. According to some embodiments, the O-rings 430A, 430B are formed of rubber. The O-rings 430A, 430B may be formed of a fluorocarbon rubber such as VITON™ available from DuPont. Other rubbers such as butyl rubber may also be used. According to some embodiments, the rubber has a durometer of between about 60 and 100 Shore A.

The module 400 may be assembled as follows in accordance with methods of the invention.

Figure 20:
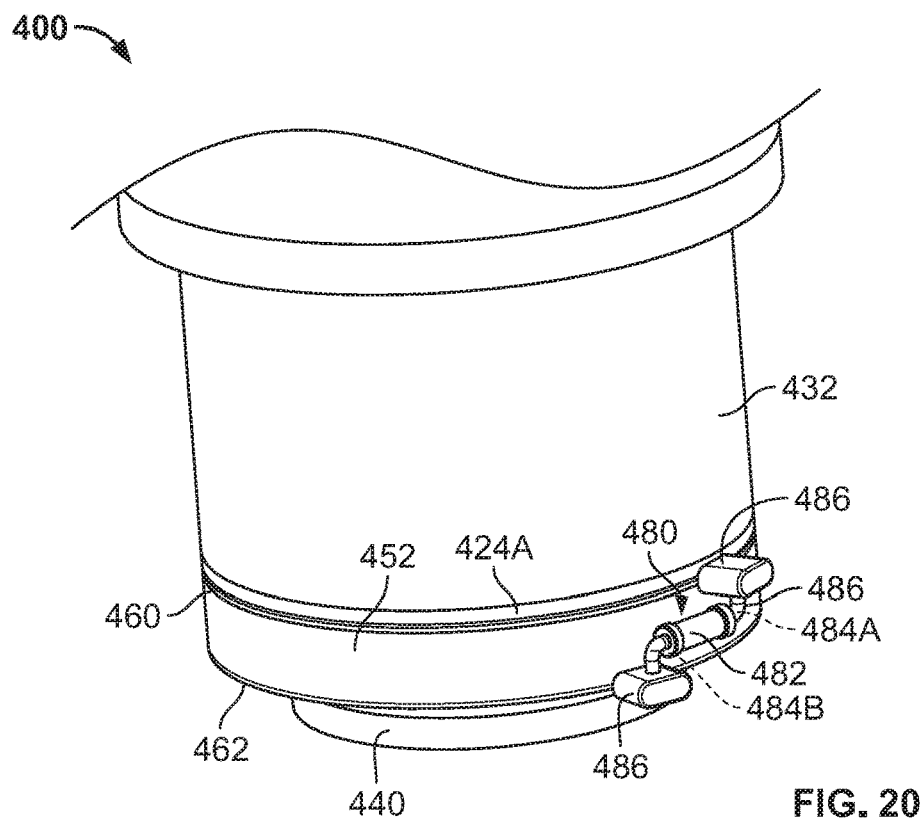
FIG. 20 is a fragmentary, perspective view of the SPD module of FIG. 17 illustrating an attachment configuration for a resistor forming a part of the SPD module.

The subassembly 450 may be preassembled. The varistor wafer is axially stacked with and interposed between the internal electrodes 460, 462. In some embodiments, the varistor wafer 452 and the internal electrodes 460, 462 are substantially coaxially aligned. The mating surfaces of the varistor wafer 452 and the internal electrodes 460, 462 may be welded or soldered together. In some embodiments and as shown in FIG. 20, the resistor body 482 is positioned laterally radially out to the side (relative to the axis B-B) of the varistor 452. The resistor leads 484A, 484B are soldered to the contact tabs 460B. The insulation 486 is applied over the leads 484A, 484B and the tabs 460B.

The GDT 440 is placed in the cavity 422C such that the terminal 440B is received in the recess 422F and engages the contact surface 422G of the end wall 422A.

The GDT contact member 442 is placed in the cavity 422C onto the GDT 440 such that the terminal 440C is received in the recess 442A and makes good electrical contact with the contact member 442.

The varistor 452, the resistor 480, and the internal electrodes 460, 462 (whether preassembled into the subassembly 450 or not) are placed in the cavity 422C such that the lower contact surface of the internal electrode 462 engages the upper face of the GDT contact member 442.

The O-rings 430A, 430B are installed in their respective grooves.

The head 424A is inserted into the cavity 422C such that the contact surface 424C engages the upper contact surface of the contact portion 460A of the interconnect member 460.

The spring washers 428E are slid down the shaft 424B. The washer 428D, the insulator ring 428C, and the end cap 428A are slid down the shaft 424B and over the spring washers 428E. A jig (not shown) or other suitable device is used to force the end cap 428A down, in turn deflecting the spring washers 428E. The clip 428B is installed in the slot 422H to maintain the load on the end cap 428A to partially deflect the spring washers 428E. The loading of the end cap 428A onto the insulator ring 428C and from the insulator ring onto the spring washers is in turn transferred to the head 424A. In this way, the subassembly 450 is sandwiched (clamped) between the head 424A and the electrode wall 422A.

The electrode head 424A and the housing end wall 422A are persistently biased or loaded against the varistor 452, the internal electrodes 460, 462, the GDT contact member 442, and the GDT 440 along a load or clamping axis C-C (FIG. 19) in directions F to ensure firm and uniform engagement between the above-identified interfacing contact surfaces. In some embodiments, the clamping axis C-C is substantially coincident with the axis B-B (FIG. 17).

In the assembled overvoltage protection device 400, the large, planar contact surfaces of the components 422A, 424A, 452, 460, 462, 442 can ensure reliable and consistent electrical contact and connection between the components during an overvoltage or surge current event. The head 424A and the end wall 422A are mechanically loaded against these components to ensure firm and uniform engagement between the mating contact surfaces.

The design of the overvoltage protection device 400 provides compressive loading of the varistor wafer 452 and the GDT 440 in a single modular unit. The overvoltage protection device 400 provides suitable electrical interconnections between the electrodes 422, 424, the varistor wafer 452 and the GDT 440 while retaining a compact form factor and providing proper thermal dissipation of energy from the varistor wafer 452.

The construction of the overvoltage protection device 400 provides a safe failure mode for the device. During use, one or more of the varistor wafer 452 may be damaged by overheating and may generate arcing inside the housing assembly 424. The housing assembly 424 can contain the damage (e.g., debris, gases and immediate heat) within the overvoltage protection device 400, so that the overvoltage protection device 400 fails safely. In this way, the overvoltage protection device 400 can prevent or reduce any damage to adjacent equipment (e.g., switch gear equipment in the cabinet) and harm to personnel. In this manner, the overvoltage protection device 400 can enhance the safety of equipment and personnel.

Additionally, the overvoltage protection device 400 provides a fail-safe mechanism in response to end of life mode in the varistor wafer 452. In case of a failure of the varistor wafer 452, a fault current will be conducted between the corresponding line and the neutral line as discussed above with regard to the varistor 132 of the SPD 100. More particularly, when the varistor 452 reaches its end of life state, the overvoltage protection device 400 will become substantially a short circuit with a very low but non-zero ohmic resistance. As a result, in an end of life condition, a fault current will continuously flow through the varistor 452 even in the absence of an overvoltage condition. In this case, the meltable member 432 can operate as a fail-safe mechanism that by-passes the failed varistor and creates a permanent low-ohmic short circuit between the terminals of the overvoltage protection device 400 in the manner described in U.S. Pat. No. 7,433,169, the disclosure of which is incorporated herein by reference.

The meltable member 432 is adapted and configured to operate as a thermal disconnect to electrically short circuit the current applied to the associated overvoltage protection device 400 around the varistor wafer 452 to prevent or reduce the generation of heat in the varistors. In this way, the meltable member 432 can operate as switch to bypass the varistor wafer 452 and prevent overheating and catastrophic failure as described above. As used herein, a fail-safe system is "triggered" upon occurrence of the conditions necessary to cause the fail-safe system to operate as described to short circuit the electrodes 422A, 424A.

When heated to a threshold temperature, the meltable member 432 will flow to bridge and electrically connect the electrodes 422A, 424A. The meltable member 432 thereby redirects the current applied to the overvoltage protection device 400 to bypass the varistor wafer 452 so that the current induced heating of the varistor ceases. The meltable member 432 may thereby serve to prevent or inhibit thermal runaway (caused by or generated in the varistor 452) without requiring that the current through the overvoltage protection device 400 be interrupted.

More particularly, the meltable member 432 initially has a first configuration as shown in FIG. 19 such that it does not electrically couple the electrode 424 and the housing 422 except through the head 424A. Upon the occurrence of a heat buildup event, the electrode 424 is thereby heated. The meltable member 432 is also heated directly and/or by the electrode 424. During normal operation, the temperature in the meltable member 432 remains below its melting point so that the meltable member 432 remains in solid form. However, when the temperature of the meltable member 432 exceeds its melting point, the meltable member 432 melts (in full or in part) and flows by force of gravity into a second configuration different from the first configuration. The meltable member 432 bridges or short circuits the electrode 424 to the housing 422 to bypass the varistor wafer 452. That is, a new direct flow path or paths are provided from the surface of the electrode 424 to the surface of the housing sidewall 422B through the meltable member 432. According to some embodiments, at least some of these flow paths do not include the varistor wafer 452.

According to some embodiments, the overvoltage protection device 400 is adapted such that when the meltable member 432 is triggered to short circuit the overvoltage protection device 400, the conductivity of the overvoltage protection device 400 is at least as great as the conductivity of the feed and exit cables connected to the device.

According to some embodiments, the areas of engagement between each of the electrode contact surfaces and the varistor contact surfaces are each at least one square inch.

According to some embodiments, the biased electrodes (e.g., the electrodes 422 and 424) apply a load to the varistors along the axis C-C in the range of from 2000 lbf and 26000 lbf depending on its surface area.

According to some embodiments, the combined thermal mass of the housing (e.g., the housing 422) and the electrode (e.g., the electrode 424) is substantially greater than the thermal mass of each of the varistors captured therebetween. The greater the ratio between the thermal mass of the housing and electrodes and the thermal mass of the varistors, the better the varistors will be preserved during exposure to surge currents and TOV events and therefore the longer the lifetime of the SPD. As used herein, the term "thermal mass" means the product of the specific heat of the material or materials of the object multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal mass of at least one of the electrode head and the electrode wall is substantially greater than the thermal mass of the varistor. According to some embodiments, the thermal mass of at least one of the electrode head and the electrode wall is at least two times the thermal mass of the varistor, and, according to some embodiments, at least ten times as great. According to some embodiments, the combined thermal masses of the head and the electrode wall are substantially greater than the thermal mass of the varistor, according to some embodiments at least two times the thermal mass of the varistor and, according to some embodiments, at least ten times as great.

As discussed above, the spring washers 428E are Belleville or wave washers. Belleville or wave washers may be used to apply relatively high loading without requiring substantial axial space. However, other types of biasing means may be used in addition to or in place of the Belleville or wave washers. Suitable alternative biasing means include one or more coil springs or spiral washers, or elastomeric spring members.

The module 400 includes one varistor 452. However, SPD modules according to further embodiments may include two or more varistors stacked in electrical series.

Figure 21:
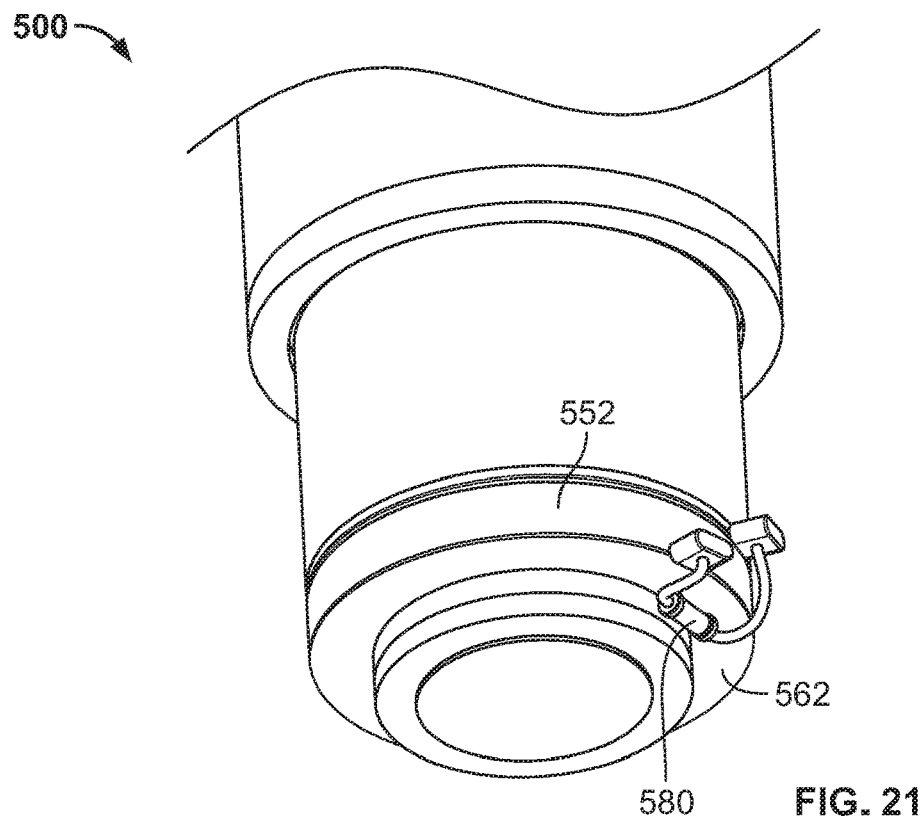
FIG. 21 is a fragmentary, perspective view of an SPD module in accordance with further embodiments of the inventive concept, illustrating an alternative attachment configuration for a resistor forming a part of the SPD module of FIG. 17.

With reference to FIG. 21, a modular overvoltage protection device or surge protective device (SPD) module to further embodiments of the present invention is shown therein and designated 500. For the purpose of explanation, only certain internal components of the module 500 are shown in FIG. 21. The module 500 is constructed, used and operates in the same manner as the module 400, except as follows.

In the module 500, the resistor 580 is mounted axially underneath the varistor 552 (i.e., axially between the internal electrode 562 and the electrode wall 422A (FIG. 19)) rather than laterally alongside the varistor 552 as in the module 400.

Figure 22:
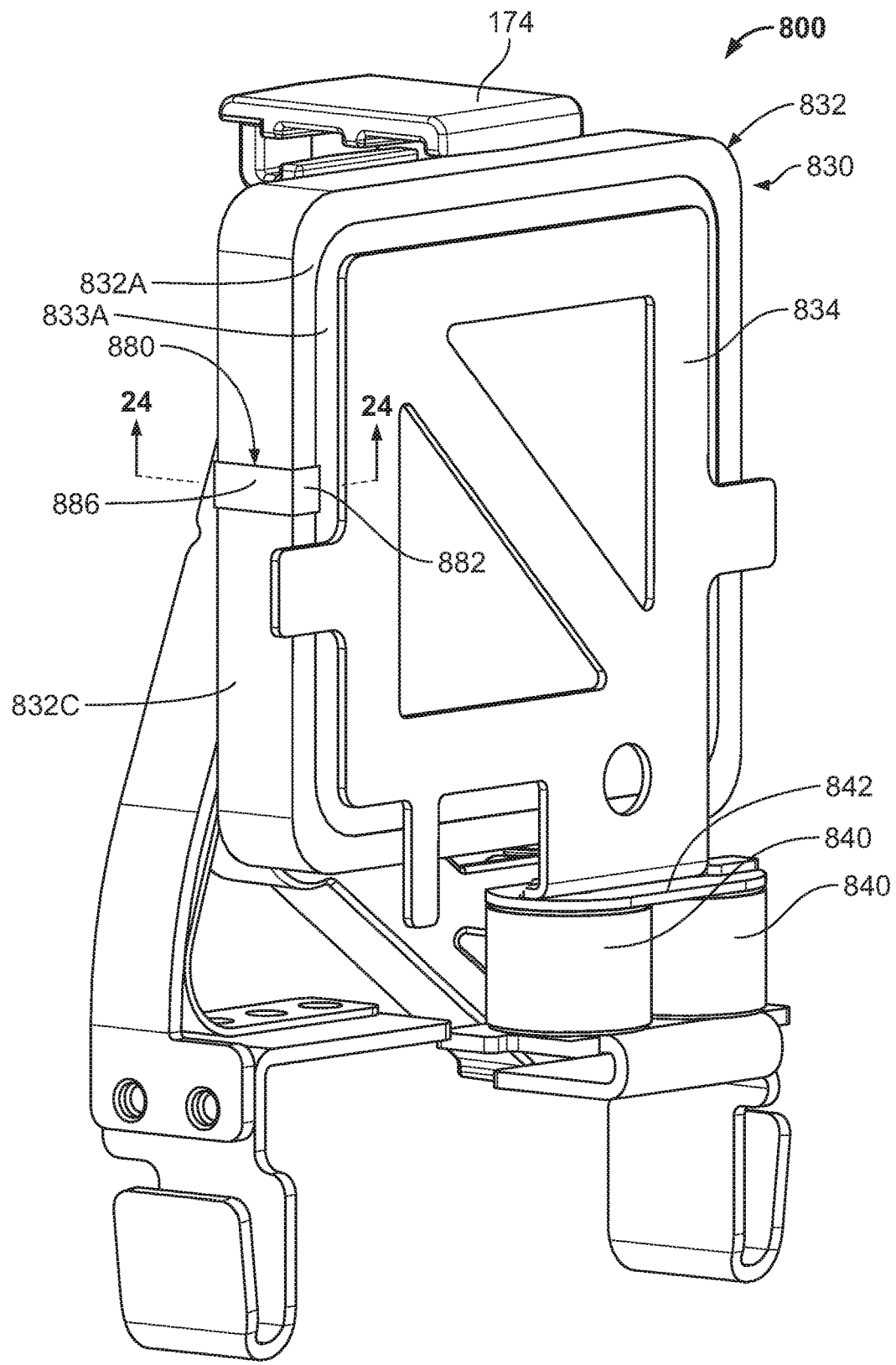
FIG. 22 is a fragmentary, perspective view of an SPD module for use in the SPD assembly of FIG. 6 in accordance with further embodiments of the inventive concept and with a cover thereof removed.
Figure 23:
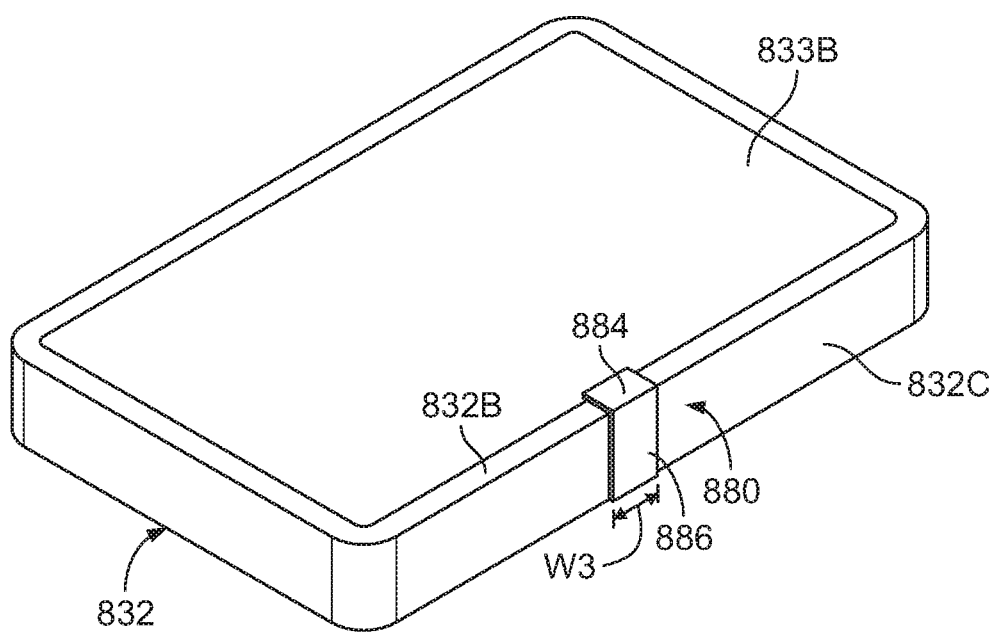
FIG. 23 is a perspective view of a varistor, metallization layers, and a resistor layer forming parts of the SPD module of FIG. 22.
Figure 24:
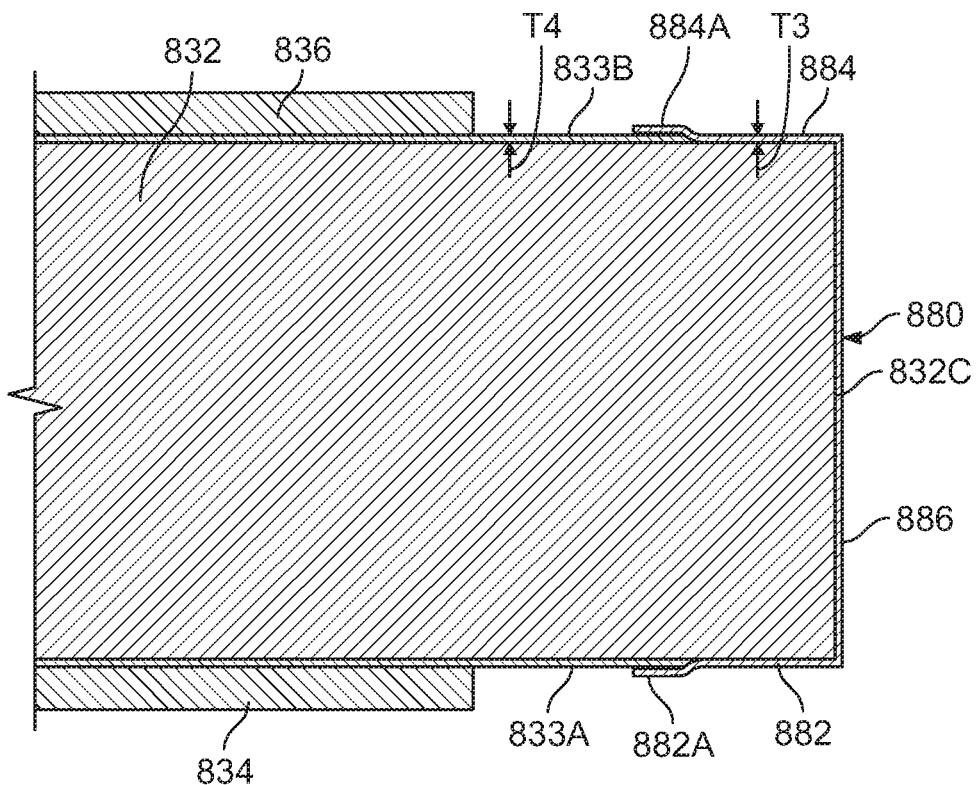
FIG. 24 is a fragmentary, cross-sectional view of the SPD module of FIG. 22 taken along the line 24-24 of FIG. 22.

With reference to FIGS. 22-24, a modular overvoltage protection device or surge protective device (SPD) module to further embodiments of the present invention is shown therein and designated 800. For the purpose of explanation, only certain internal components of the module 800 are shown in FIGS. 22-24. The module 800 is constructed, used and operates in the same manner as the module 100, except as follows.

The SPD module 800 includes the overvoltage protection circuit 600 of FIG. 1.

The SPD module 800 includes an overvoltage clamping element assembly 830. The overvoltage clamping element subassembly 830 includes a varistor 832, a first electrode 834, a second electrode 836, two gas discharge tubes (GDT) 840, and a GDT electrode or contact plate 842 corresponding to the varistor 132, the first electrode 134, the second electrode 136, the GDTs 140, and the GDT electrode 142 (see, e.g., FIGS. 8 and 12). The overvoltage clamping element subassembly 830 further includes a layer 880 of an electrical resistor material in place of the resistor 180.

The varistor 832 has opposed contact surfaces 832A, 832B. A peripheral side edge surface 832C surrounds the varistor 832 and separates the contact surfaces 832A, 832B. Respective metallization layers 833A, 833B cover the contact surfaces 832A, 832B.

The resistor layer 880 includes a first strip, leg or section 882, a second strip, leg or section 884, and a bridge strip, leg or section 886 extending between, adjoining and electrically connecting each of the sections 882, 884.

The resistor layer 880 is wrapped around the varistor 832 such that the bridge section 886 spans the side edge 832C and portions 882A, 884A of the first section 882 and the second section 884 overlap and engage the metallization layers 833A and 833B, respectively. The metallization layers 833A and 833B are in turn in electrical contact with the electrodes 834 and 836, respectively. In this manner, the resistor layer 880 electrically connects the electrode 834 to the electrode 836 through the resistor layer 880. The resistor layer 880 thereby is electrically in parallel with the varistor 832 between the electrodes 834, 836.

The resistor layer 880 may be a thin film resistor layer. The resistor layer 880 may be a thick film resistor layer. In some embodiments, the resistor layer 880 is a layer of an electrically resistive paste. The electrically resistive paste may include an alumina substrate (90% or more by weight) mixed with other materials. The composition may vary. According to some embodiments, the material of the resistor paste has a viscosity in the range of from about 100 to 200 Pa-s before the material is screen printed and fired. Suitable electrically resistive pastes include the 4300-Series resistors available from DuPont Microcircuit Materials of Research Triangle Park, N.C.

In some embodiments, the resistor layer 880 is formed of an electrically resistive (e.g., paste) have a sheet resistance in the range of from about 1 Ω/square to 1 MΩ/square.

In some embodiments, the resistor layer 880 is bonded to the surfaces 832A, 832B, 832C and metallization layers 833. In some embodiments, the resistor layer 880 is directly bonded to the surfaces 832A, 832B, 832C and metallization layers 833. In some embodiments, the adhesively directly bonded to said surfaces.

The dimensions of the resistor layer 880 may be selected to obtain the desired electrical performance. In some embodiments, the resistor layer 880 has a thickness T3 (FIG. 24) in the range of from about 2 μm to 1000 μm and, in some embodiments, in the range of from about 50 μm to 90 μm.

In some embodiments, the resistor layer 880 has a width W3 (FIG. 23) in the range of from about 1 mm to 20 mm.

In some embodiments, the overvoltage clamping element assembly 830 includes a plurality of the resistor layers 880 mounted on the varistor 832 and in electrical parallel with the varistor 832.

The resistor layer 880 may be mounted on the varistor 832 using any suitable technique. Suitable techniques may include printing or deposition (e.g., vapor deposition, sputtering or vacuum deposition), for example.

Figure 25:
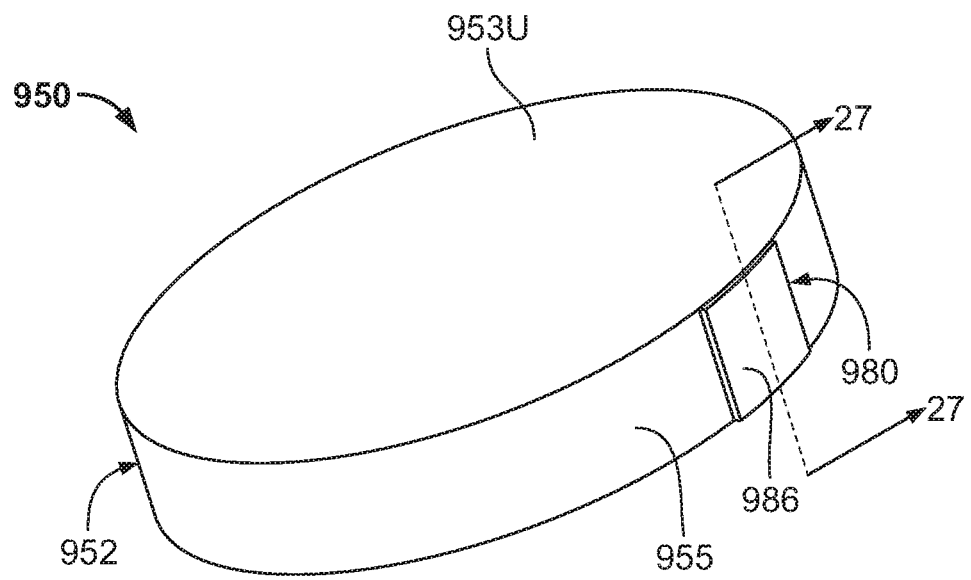
FIG. 25 is a perspective view of an overvoltage clamping element subassembly according to further embodiments.
Figure 26:
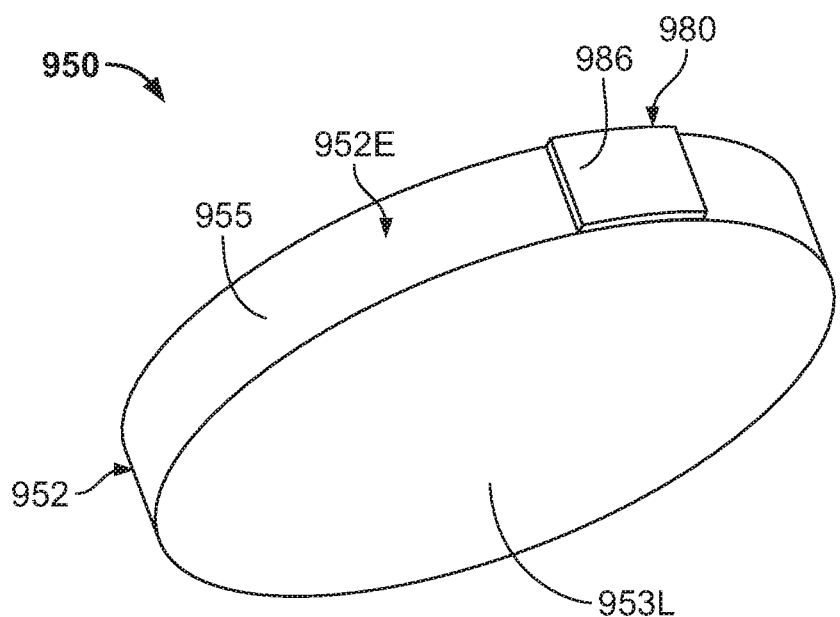
FIG. 26 is a bottom perspective view of the overvoltage clamping element subassembly of FIG. 25.
Figure 27:
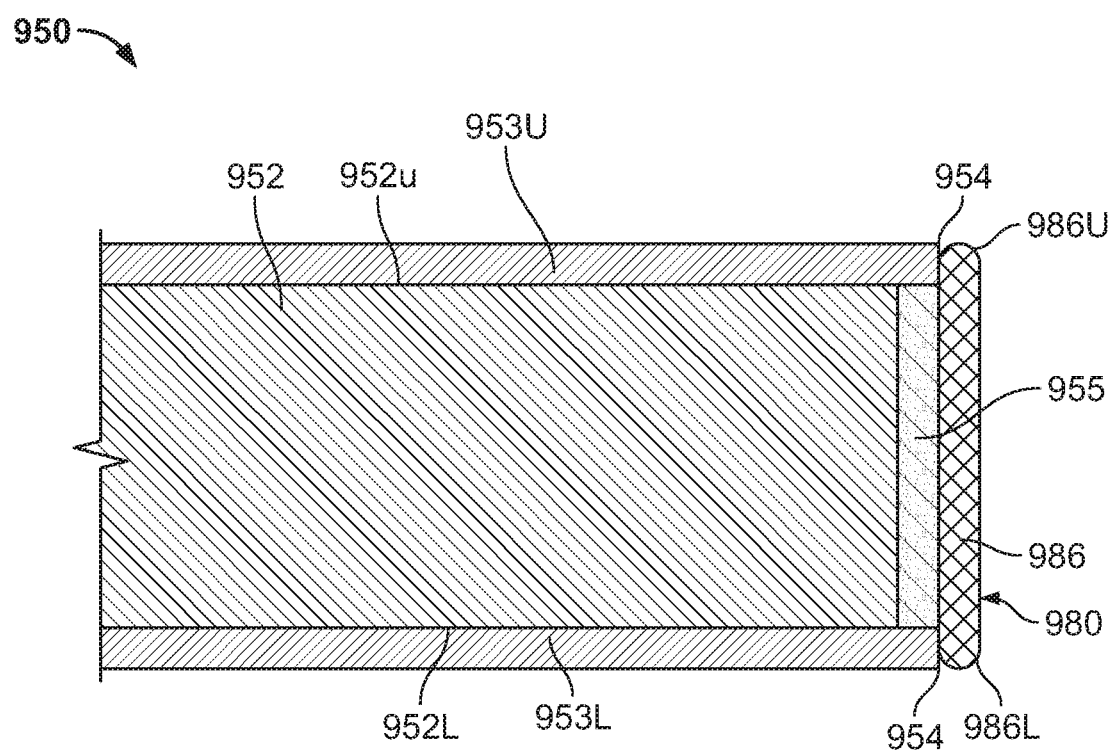
FIG. 27 is a fragmentary, cross-sectional view of the overvoltage clamping element subassembly of FIG. 25 taken along the line 27-27 of FIG. 25.

With reference to FIGS. 25-27, an overvoltage clamping element subassembly 950 according to further embodiments is shown therein. The subassembly 950 may be used in place of the subassembly 450 of the SPD 400 (FIG. 18). The subassembly 950 includes a varistor 952, corresponding to the varistor 452, and opposed metallization layers 953U and 953L. The subassembly 950 further includes a resistor layer 980 in place of the resistor 480. The internal electrodes 460, 462 of the subassembly 450 may be omitted.

The varistor 952 has opposed contact surfaces 952U, 952L. A peripheral side edge surface 952E surrounds the varistor 952 and separates the contact surfaces 952U, 952L.

Respective metallization layers 953U and 953L cover the contact surfaces 952U and 952L. In some embodiments and as shown in FIGS. 25-27, each metallization layer 953U, 953L covers the entirety of its surface 952U, 952L and has a terminal peripheral metallization edge 954. The peripheral metallization edges 954 are located at or radially outward beyond the corners 956 defined between the side edge surface 952E and the contact surfaces 952U, 952L. A peripheral passivation layer 955 (FIG. 27) may cover the side edge surface 952E. The passivation layer 955 may be a glass material that surrounds the full circumference of the side surface 952E.

The resistor layer 980 includes a strip 986 having opposed axial terminal edges or ends 986U and 986L.

The resistor layer 980 covers the varistor 952 such that the strip 986 spans the side edge 952E and the ends 986U and 986L engage and make electrical contact with the peripheral edges 954 of the metallization layers 953U and 953L, respectively. The metallization layers 953U and 953L are in turn in electrical contact with the electrode head 424A and the GDT contact member 442 (FIG. 18), respectively. In this manner, the resistor layer 980 electrically connects the electrode 424 to the electrode 422 through the resistor layer 980. The resistor layer 980 thereby is electrically in parallel with the varistor 952 between the electrodes 422, 424.

In some embodiments, the resistor layer 980 is bonded to the edge surface. In some embodiments, the resistor layer 980 is directly bonded to the surface 952E and the metallization layers 953U, 953L. In some embodiments, the resistor layer 980 is adhesively directly bonded to the edge surface 952E.

In some embodiments, the subassembly 950 includes a plurality of the resistor layers 980 mounted on the varistor 952 and in electrical parallel with the varistor 952.

The resistor layer 980 may be formed with the same materials, dimensions, properties (including sheet resistance) and techniques as discussed above for the resistor layer 880.

The metallization layers 133, 833A, 833B, 953U, 953L may be formed of any suitable metal, such as aluminum, copper or silver. In some embodiments, the metallization layers are bonded (e.g., adhesively bonded) to the respective surfaces of the varistors 132, 852, 952 covered by the metallization layers. In some embodiments, each metallization layer 133, 833A, 833B, 953U, 953L has a thickness (e.g., thickness T4 in FIG. 24) in the range of from about 10 μm to 100 μm.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A surge protective device (SPD) module, comprising:
   a first electrical terminal;
   a second electrical terminal;
   an overvoltage protection circuit connected between the first and second electrical terminals, the overvoltage protection circuit comprising:
   a gas discharge tube;
   a current management circuit connected in series to the gas discharge tube, the current management circuit comprising a resistor and an inductor connected in series between a first node of the current management circuit and a second node of the current management circuit, a first terminal of the resistor is directly connected to the first node, a first terminal of the inductor is directly connected to the second node, and second terminals of the resistor and the inductor, respectively, are directly connected to each other; and
   a varistor connected between the first and second nodes of the current management circuit in parallel with a series combination of the resistor and the inductor.

2. The SPD module of claim 1, wherein the inductor comprises a Surface Mount Device (SMD) inductor.

3. The SPD module of claim 1, wherein the inductor has an inductance in a range of from about 1 μH to about 1 mH.

4. The SPD module of claim 1, wherein the overvoltage protection circuit further comprises:
   a thermal disconnector mechanism that is connected in series to the gas discharge tube and the current management circuit, the thermal disconnector mechanism being configured to electrically disconnect the first electrical terminal from the second electrical terminal responsive to a thermal event.

5. The SPD module of claim 1, wherein the resistor comprises an axial resistor and has a resistance in a range of from about 1 kΩ to 50 MΩ.

6. The SPD module of claim 1, wherein the resistor comprises a radial resistor and has a resistance in a range of from about 1 kΩ to 50 MΩ.

7. The SPD module of claim 1, wherein the resistor comprises a Surface Mount Device (SMD) resistor and has a resistance in a range of from about 1 kΩ to 50 MΩ.

8. The SPD module of claim 1, wherein the varistor has a peak current rating in a range of about 20 kA and a peak voltage rating of about 300 V.

9. The SPD module of claim 1, wherein the gas discharge tube has a sparkover voltage rating of about 500 V and a discharge current rating of about 20 kA.

10. The SPD module of claim 1, wherein the varistor has a clamping voltage level associated therewith that exceeds an ambient voltage level associated with the first electrical terminal.

11. The SPD module of claim 10, wherein the current management circuit is configured to facilitate a transition of the gas discharge tube from the conducting state to the non-conducting state by dissipating energy associated by causing the voltage across the gas discharge tube to be less than an arc voltage associated with the gas discharge tube responsive to termination of the transient overvoltage event.

12. The SPD module of claim 11, wherein the first electrical terminal is configured for connection to a line and the second electrical terminal is configured for connection to a common reference voltage.

13. The SPD module of claim 12, wherein the line is an Alternating Current (AC) power line or a Direct Current (DC) power line.

14. The SPD module of claim 12, wherein the line is a communication line configured to transmit a communication signal.

15. The SPD module of claim 14, wherein the communication signal is an RF communication signal.

16. The SPD module of claim 1 including:
a base configured to be mounted on a DIN rail; and
an SPD module configured to be removably mounted on the base, wherein when the SPD module is mounted on the base the SPD module and the base together form a DIN rail SPD assembly, the SPD module including:
a module housing;
the first and second electrical terminals mounted on the module housing;
the gas discharge tube disposed in the module housing; and
the current management circuit disposed in the module housing.

17. The SPD module of claim 16 wherein the SPD module includes:
a thermal disconnector mechanism positioned in a ready configuration, wherein the varistor is electrically connected with the second electrical terminal, the thermal disconnector mechanism being repositionable to electrically disconnect the varistor from the second electrical terminal, the thermal disconnector mechanism including:
an electrode electrically connected to the varistor in the ready configuration; and
a solder securing the electrical conductor in electrical connection with the varistor in the ready configuration, wherein:
the solder is meltable in response to overheating in the SPD module; and
the thermal disconnector mechanism is configured to electrically disconnect the electrical conductor from the varistor and thereby disconnect the varistor from the second electrical terminal when the solder is melted.

18. The SPD module of claim 17 wherein the SPD module includes an indicator mechanism configured to provide an alert that the SPD module has failed when the thermal disconnector mechanism disconnects the overvoltage clamping element from the second electrical terminal.

19. The SPD module of claim 18 wherein the indicator mechanism includes a local alert mechanism including:
a window in the module housing;
an indicator member movable between a ready position and an indicating position relative to the window; and
an indicator spring configured to force the indicator member from the ready position to the indicating position when the thermal disconnector mechanism disconnects the varistor from the second module electrical terminal.

20. The SPD module of claim 1 wherein the SPD is an SPD module including:
a module housing including first and second electrodes, wherein the first electrode includes the first electrical terminal and the second electrode includes the second electrical terminal; and
the gas discharge tube and the varistor are axially stacked between the first and second electrodes in the module housing.

21. The SPD module of claim 20 wherein:
the first electrode includes a housing electrode including an end wall and an integral sidewall collectively defining a cavity;
the second electrode extends into the cavity; and
the gas discharge tube and the varistor are disposed in the cavity.

22. The SPD module of claim 21 wherein the housing electrode is unitarily formed of metal.

23. The SPD module of claim 20 including a biasing device applying an axially compressive load to the gas discharge tube and the varistor.

24. The SPD module of claim 20 including an electrically conductive meltable member, wherein the meltable member is responsive to heat in the overvoltage protection device to melt and form an electrical short circuit path across the first and second electrode members.

25. The SPD module of claim 20 wherein the varistor comprises a varistor wafer.

26. The SPD module of claim 25 including:
a first internal electrode axially interposed between the varistor wafer and the first electrode; and
a second internal electrode axially interposed between the varistor wafer and the second electrode;
wherein the resistor is electrically connected to the first and second electrodes in the module housing.

27. The SPD module of claim 25 wherein the resistor is positioned laterally alongside an outer edge of the varistor wafer.

28. The SPD module of claim 25 wherein the resistor is positioned axially underneath the varistor wafer.

29. The SPD module of claim 1, wherein the resistor is configured to discharge a capacitance of the varistor responsive to a voltage surge event across the first and second electrical terminals.

30. The SPD module of claim 1, wherein the resistor is a layer of an electrically resistive material mounted on the varistor.

* * * * *

UNITED STATES PATENT AND TRADEMARK OFFICE
CERTIFICATE OF CORRECTION

PATENT NO. : 11,223,200 B2
APPLICATION NO. : 16/046281
DATED : January 11, 2022
INVENTOR(S) : Tsovilis et al.

It is certified that error appears in the above-identified patent and that said Letters Patent is hereby corrected as shown below:

In the Specification

Column 11, Line 35: Please correct "port 821" to read -- port 82I --

Signed and Sealed this
Tenth Day of May, 2022

Katherine Kelly Vidal
*Director of the United States Patent and Trademark Office*